(12) United States Patent
Secer

(10) Patent No.: US 7,797,409 B1
(45) Date of Patent: Sep. 14, 2010

(54) SYSTEM AND METHOD FOR MANAGING A COMMUNICATION NETWORK UTILIZING STATE-BASED POLLING

(75) Inventor: Semih Secer, Fair Oaks, CA (US)

(73) Assignee: Sobha Renaissance Information Technology, Karnataka (IN)

( * ) Notice: Subject to any disclaimer, the term of this patent is extended or adjusted under 35 U.S.C. 154(b) by 2421 days.

(21) Appl. No.: 09/770,427

(22) Filed: Jan. 26, 2001

(51) Int. Cl.
G06F 15/173 (2006.01)
(52) U.S. Cl. .................. 709/223; 709/224; 709/226; 709/229
(58) Field of Classification Search ......... 709/223–226, 709/229, 263; 370/449, 450
See application file for complete search history.

(56) References Cited

U.S. PATENT DOCUMENTS

| | | | | |
|---|---|---|---|---|
| 5,261,044 A | * | 11/1993 | Dev et al. | 715/855 |
| 5,615,323 A | * | 3/1997 | Engel et al. | 345/440 |
| 5,734,642 A | * | 3/1998 | Vaishnavi et al. | 370/255 |
| 6,047,279 A | * | 4/2000 | Barrack et al. | 706/60 |
| 6,199,172 B1 | * | 3/2001 | Dube et al. | 714/4 |
| 6,405,250 B1 | * | 6/2002 | Lin et al. | 709/224 |
| 6,430,712 B2 | * | 8/2002 | Lewis | 714/47 |
| 6,513,129 B1 | * | 1/2003 | Tentij et al. | 714/4 |
| 6,664,978 B1 | * | 12/2003 | Kekic et al. | 345/733 |
| 6,901,440 B1 | * | 5/2005 | Bimm et al. | 709/223 |
| 6,990,518 B1 | * | 1/2006 | Secer | 709/223 |
| 7,209,968 B1 | * | 4/2007 | Secer | 709/226 |

OTHER PUBLICATIONS

Rose, M. RFC 1155, "Structure and Identification of Management Information for TCP/IP based Internets", May 1990.*
Case, J. RFC 1157, "A Simple Network Management Protocol (SNMP)", May 1990.*
Rose, M. RFC 1212, "Concise MIB Definitions", May 1991.*
McClogherie, K. RFC 1213, "Management Information Base for Network Management of TCP/IP-based Internets: MIB II", Mar. 1991.*

* cited by examiner

Primary Examiner—Lashonda T Jacobs
(74) Attorney, Agent, or Firm—Holland & Hart L.L.P.

(57) ABSTRACT

A system and method are disclosed which utilize a state model for managing a network. A user can define a state model using, for example, a graphical user interface. A user may define one or more poll services that include state model(s) therein to be simultaneously executed, which enables efficient operation of such state models. A most preferred embodiment provides a central management system that is communicatively coupled to one or more distributed polling gateways for executing the user-defined state models to manage network elements. Upon the polling gateway determining that a state transition is proper, the state of the network element is transitioned, and user defined transition actions for such state transition are triggered in response thereto. A user may implement cross-correlation of various different state models in managing network elements. Additionally, a user may dynamically define/modify polling services and/or state models during runtime.

63 Claims, 13 Drawing Sheets

FIG. 7B

| PATTERN NAME | "PATTERN 1" |
|---|---|
| PATTERN CONDITION | IF (CPU STATE = HIGH AND MEMORY STATE = HIGH AND BUFFER STATE = MEDIUM) |
| ACTIONS | GENERATE ALERT WITH MINOR SEVERITY |

FIG. 7C

| PATTERN NAME | "PATTERN 2" |
|---|---|
| PATTERN CONDITION | IF (CPU STATE = HIGH AND MEMORY STATE = HIGH AND BUFFER STATE = HIGH) |
| ACTIONS | GENERATE ALERT WITH MAJOR SEVERITY. START SERVICES: ALLOCATE ADDITIONAL MEMORY RESOURCES AND ALLOCATE ADDITION CPU RESOURCES. STOP SERVICES: STOP APPLICATIONS TO PRESERVE |

FIG. 8

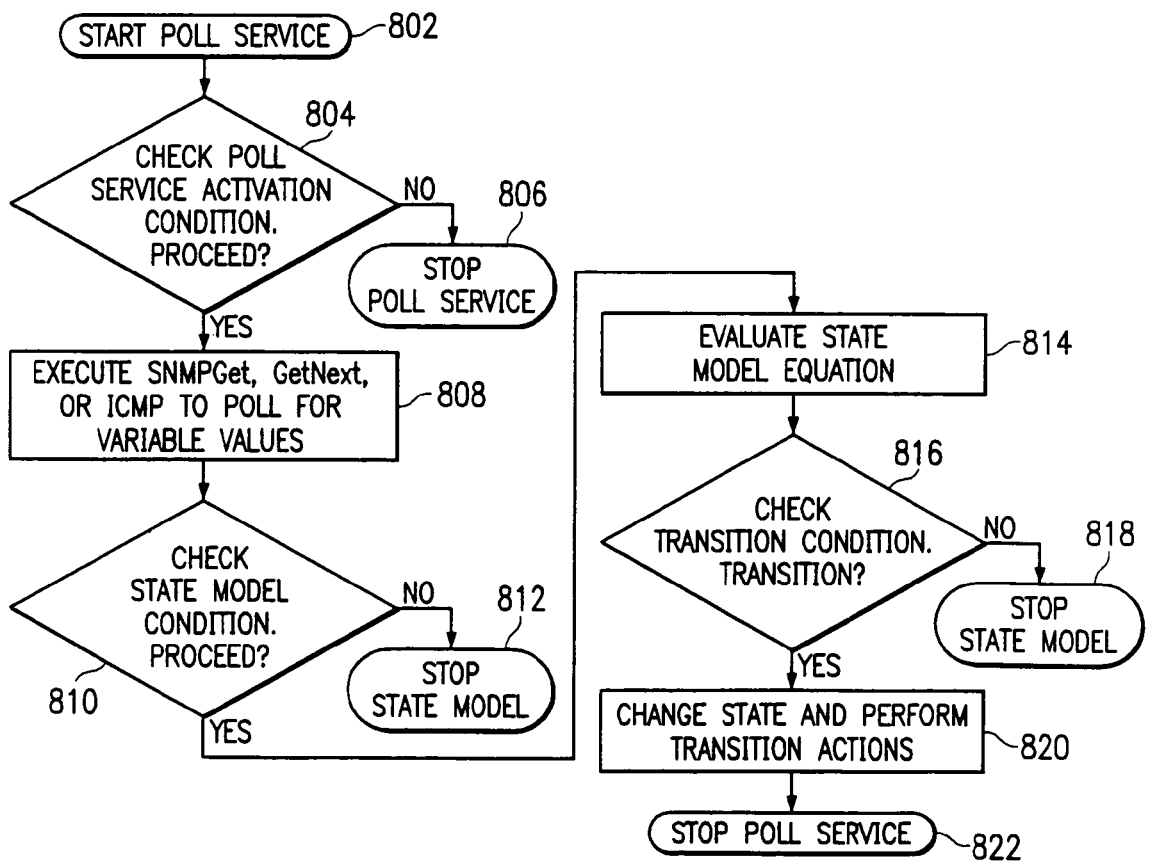

SYSTEM AND METHOD FOR MANAGING A COMMUNICATION NETWORK UTILIZING STATE-BASED POLLING

RELATED APPLICATIONS

This application is related to co-pending application entitled "SYSTEM AND METHOD FOR POLICY-BASED NETWORK MANAGEMENT," assigned Ser. No. 09/469,025, filed Dec. 21, 1999; co-pending application entitled "SYSTEM AND METHOD FOR A COMMON OBJECT CLASS LIBRARY," assigned Ser. No. 09/469,026, filed Dec. 21, 1999; co-pending application entitled "FAULT MANAGEMENT SYSTEM AND METHOD," assigned Ser. No. 09/345,634, filed Jun. 30, 1999; and co-pending application entitled "METHOD AND SYSTEM FOR PREDICTIVE ENTERPRISE RESOURCE MANAGEMENT," assigned Ser. No. 09/702,160, filed Oct. 30, 2000, all of which are assigned to a common assignee, the disclosures of which are hereby incorporated herein by reference.

TECHNICAL FIELD

This application relates in general to network management systems, and more specifically to a system and method in which a network management system utilizes state-based polling to manage network elements.

BACKGROUND

The information-communication industry is an essential element of today's society, which is relied upon heavily by most companies, businesses, agencies, educational institutions, and other entities, including individuals. As a result, information service providers such as telephone, cable, and wireless carriers, Internet Service Providers (ISPs) and utility companies all have the need to deploy effective systems suitable for servicing such a demand. The importance of such information service providers rapidly deploying new systems and system elements and altering their existing management systems to accommodate evolving business and network requirements as needed has been recognized in the prior art. For example, it has been recognized that information service providers desire the ability to integrate existing network equipment and systems with new elements and applications, customize existing systems and applications, and scale systems to accommodate growing networks and traffic volumes.

Network management and operations have become crucial to the competitiveness of communication companies, utilities, banks and other companies operating Wide Area Networks (WANs) of computer devices and/or other network types and devices, including SONET, Wireline, Mobile, etcetera. For instance, many companies currently use customized "legacy" network management systems (NMSs) and operations support systems (OSSs). However, such NMSs/OSSs are generally based on older technologies, which poorly integrate disparate network elements and associated Element Management Systems (EMSs). Many other companies use other types of EMSs, NMSs and OSSs that are not scalable, cannot be easily interfaced with disparate network elements, and require costly programming while offering limited features and flexibility.

Objective Systems Integrators, Inc. ("OSI") of Folsom, Calif., the assignee of the present invention, currently produces a Framework virtual system management (VSM) which is both operationally and network-focused, and is primarily used in the development of EMSs and NMSs sold under the trademark NetExpert™. In general, NetExpert™ may allow for relatively easy and inexpensive integration of disparate network elements and associated EMSs within a network. NetExpert™ is an object-oriented network management system that is comprised of a set of integrated software modules and graphical user interface (GUI) development tools that permit the creation and deployment of network management and operations support solutions. Each element type, device, device component, and even database may be managed as a separate "object." NetExpert, like other NMSs/OSSs on the market today, may require customization for each managed object.

Each element type and device, as well as other managed objects, requires a separate set of rules (known as rule sets) to be tailored to the nature of the object. An object may comprise specific hardware and software, and also may include the business practices of the company. Each rule set provides the details for the management of the particular object to which the rules are directed. NetExpert's Fourth Generation Language (4GL) editors permit this customization to be performed by subject matter experts (SMEs). SMEs use their knowledge to create simple rule sets, such as "if-then" statements, to manage their Network Elements, EMSs, or NMSs, rather than requiring skilled programmers to integrate devices and other elements with additional computer software code such as C and/or C++.

EMSs/NMSs can manage a wide range of communications and computer devices, including switches, DCS, SONET ADM's, routers, testing devices, video units, banking ATM machines, air traffic control systems, and other computer elements such as databases and objects. OSSs provide a broader layer of functionality to directly support the daily operation of the network, such as order negotiation, order processing, line assignment, line testing and billing. EMSs/NMSs can be a component of a larger OSS system. For the sake of simplicity, but not limitation, the communication switching network context will be used throughout much of this application.

Each device, such as a switch, for example, either responds to or has available certain information relating to its operation, such as performance, fault, configuration, and inventory. For each device, the correlation of performance information with operational functions is typically provided within the EMS/NMS/OSS. For example, when an equipment provider develops and markets a new switch, a skilled programmer typically identifies and analyzes the performance information for that switch and then correlates that information with all of the functionalities that a customer may desire to use in connection with that switch. The programmer typically then modifies the existing EMS/NMS/OSS program code to manage that switch. Additionally, as disclosed in commonly assigned U.S. Pat. No. 6,047,279 entitled "SYSTEM AND METHOD FOR AUTOMATIC NETWORK MANAGEMENT SUPPORT USING ARTIFICIAL INTELLIGENCE," the disclosure of which is hereby incorporated by reference herein, an EMS/NMS/OSS may use artificial intelligence (e.g., expert systems and learning techniques) to automatically identify and integrate new network elements.

NetExpert™, OSI's network management and operations support framework, currently uses a high-level computer language to permit non-programmers to write rule sets to manage or route information within NetExpert, between NetExpert systems, or between NetExpert and other programs and functions, without the cost and complexity of other EMSs/NMSs/OSSs. For example, if a particular fault message is generated by the switch, one customer may want to page a particular technician, while a second customer may only want to have an indicator light activated or a warning message generated. Generally, these rules are entered through an editor, such as NetExpert's 4GL editor.

In providing and operating a network, monitoring and control functionality is clearly important to support various management aspects of the network. In more recent times, not only does the network itself have to be managed, but the services provided by the network also have to be managed. Generally, a network management system has to have interfaces with the network it is managing so that it can monitor or test various aspects of the network, such as the current configuration and traffic conditions, and also determine whether the network is performing satisfactorily, i.e., meeting any performance criteria applicable.

Given the importance of network systems, it is crucial that information service providers maintain the operability, integrity, performance level, and overall "health" of the network. For example, a service level contract between a service provider and a customer often requires that the service provider provide a particular quality of service to the customer. The term "performance" may be utilized herein for conciseness, which is intended to broadly encompass the network's (or a network element's) operability, integrity, and various other conditions of the network and/or its elements affecting their overall "health." As an example, a service provider may utilize a computer network, such as Ethernet, Token Ring, fiber distributed data interface, virtual circuit switched network, e.g., frame relay (FR) or asynchronous transfer mode (ATM) network, which may each include one or more computer systems and/or other types of "network elements." It is important to manage such network elements to ensure proper performance of the network (and to enable quick ascertainment of improper performance of the network).

Polling gateways have been implemented in prior art network management systems for polling and monitoring the operations of various network elements. An exemplary implementation of a prior art network management system is shown in FIG. 1. As shown, NMS 102 includes polling gateways 104 and 106, which poll network element(s) to gather information about various operational characteristics of such network element(s). For instance, in the example of FIG. 1, polling gateway 104 polls (or requests information from) network elements 1 and 2, and polling gateway 106 polls network elements 3 and 4. Such polling gateways of prior art systems are typically implemented to poll their respective network elements according to pre-set time intervals. For instance, a gateway may be pre-set to poll its respective network element(s) once every five minutes or once every twenty minutes, as examples. Thus, polling gateways 104 and 106 are typically implemented having a pre-set polling interval. Furthermore, such pre-set polling interval for polling gateways of the prior art is typically fixed, and does not change with various performance characteristics detected for their respective network elements. That is, while a polling gateway of the prior art may allow a user to manually adjust its polling interval, prior art gateways do not autonomously modify their polling intervals based on the performance of their respective network elements.

Gateways of the prior art, such as gateways 104 and 106, are typically implemented to access (e.g., communicate with) network element(s), such as network elements 1-4, to request values for various variables detailing information about the operation/performance of the network element(s). For example, a gateway may periodically poll a network element to determine whether the network element is operational and responding to the poll. If a network element fails to respond to such a poll, such failure to respond may be indicative of a problem with the network element, such as the network element having a hardware or software failure. As other examples, a gateway may periodically poll a network element to determine the workload being placed on such network element, the network element's available memory capacity, etcetera. Once the gateways receive the variable values from the network elements in response to a poll, the gateways then process such variable values to monitor the operation of the network element(s). For instance, if a gateway polls a network element for a response and fails to receive such a response, the gateway may provide an alert to the network administrator (e.g., by presenting an alert message to a computer workstation coupled to NMS 102) notifying him/her of a problem with the network element. Similarly, if a gateway polls a network element for its available memory and determines that such network element has little or no memory available, the network administrator may be alerted as to such condition.

Typically, different poll cycles may be implemented within a gateway for a network element. That is, a gateway may include a different poll cycle for issuing various different poll requests to the network element(s). For example, a gateway may include one poll cycle that polls a network element once every 5 minutes to determine whether the gateway is responsive, and the gateway may include another poll cycle that polls the network element once every 30 minutes to determine the amount of available memory. Gateways of the prior art typically do not correlate various polls that they perform on one or more network elements, and therefore typically lack an intelligent understanding as to the operation of such network elements. For example, to monitor a particular network element, a gateway may have multiple polling cycles that each request different information about the network element. The gateway polls the network element for one or more items of information (e.g., for one or more operational variable values) during one polling cycle and polls it for another item(s) of information (e.g., for one or more other operational variable values) during another polling cycle. In prior art gateways, the two items of information are not correlated during processing by the gateway. That is, items of information gathered in one or more polling cycles are not correlated by prior art gateways.

As an example, suppose during one polling cycle a gateway polls a network element to determine whether it is responsive, and during another polling cycle the gateway polls the network element to determine the status of its CPU memory buffer. Suppose further that through the first polling cycle, the gateway determines that the network element is not responsive. Because it is not responsive, there is no point of attempting to poll the network element as to the status of its CPU memory buffer. However, because the polling processes are not correlated in prior art systems, the gateway would continue to periodically poll for the CPU memory buffer even though another polling process has determined that the network element is not responsive. Therefore, prior art gateways are typically implemented with very little intelligence, and do not correlate various polled conditions of network elements to obtain an intelligent view of the overall condition of the network elements.

Furthermore, as shown in FIG. 1, the polling gateways are typically not distributed, but are instead included within the network management system (NMS 102). As a result, a great operational burden is placed on the NMS 102 because all of the poll responses and gateway processing is included within the NMS 102.

Traditionally, gateway polling has not been dependent or controlled based on the state of the monitored network element(s). That is, state-based polling has traditionally not been performed in prior art network management systems. Recently, state-based polling has been proposed, wherein the polling of network elements is performed in a manner that is dependent on the state of such network elements. More specifically, certain processing (or actions) to be performed by the polling gateway may be different depending on the state of the network elements being polled by such gateway.

A relatively simple example of a state-based approach to polling is shown in FIG. 2. As shown in this example of state-based model 200, a gateway may have two states defined for a particular network element: "normal" state and "fault" state. As further shown, model 200 includes two transitions that have been defined, i.e., a transition from the normal state to the fault state, and a transition from the fault state to the normal state. It should be understood that additional states may be defined within the model, as well as additional transitions. It should also be understood that transitions may or may not be defined to enable a transition from one state to any other state. For instance, suppose a third state named "abnormal" were defined within model 200 of FIG. 2. As shown, a transition may be defined for transitioning from the normal state to the fault state. Additionally, a transition may be defined for transitioning from the fault state to the newly added "abnormal" state. However, a transition may or may not be defined for transitioning from the normal state to the newly added "abnormal" state, depending on how model 200 is defined by a user (e.g., by a system administrator responsible for managing the network).

Model 200 includes conditions that have been defined to specify when each transition is to be triggered. In this example, if a processing error occurs within the network element (i.e., the condition for the Normal to Fault transition is satisfied), then the state of the network element transitions from normal to fault, and if a processing error is resolved, then the state of the network element transitions from fault back to normal. Transition actions may also be defined within model 200. As shown, such transition actions may consist of alerting a user of the condition being satisfied, logging the detected condition (e.g., to a file or database), and modifying the polling interval of the gateway. For instance, upon a processing error occurring within the network element, the polling interval of the gateway may be decreased so that the gateway polls the network element more often to monitor such network element more closely. On the other hand, once a processing error is resolved, the default (or normal) polling interval may be resumed for the network element to reduce the processing burden on the gateway.

It has been proposed in the prior art that a user, such as a network administrator, may define a state-based polling model, such as model 200 of FIG. 2. More specifically, a user may write code to define state(s) for a network element, transition(s), condition(s) for triggering such transition(s), and action(s) to be triggered upon the condition(s) being satisfied. While the above-described state-based polling has been proposed in the prior art, prior art polling systems, including such state-based polling system, have many problems and/or shortcomings.

As one example, polling gateways of prior art systems are not distributed. For instance, as shown in FIG. 1, polling gateways of the prior art have traditionally been implemented local to or integrated within the NMS system. While NMS systems that include polling gateways may be implemented at a variety of different locations throughout network(s) in the prior art, such NMS systems are typically not implemented such that they are in communication with each other or with a common central management system (MS). Because prior art management systems typically utilize a plurality of stand-alone NMS systems, software code for controlling the polling gateways at each NMS system (such as software code for implementing state-based polling) must be written, installed, and maintained on each independent NMS system, which is often burdensome to system administrators in implementing and maintaining each independent NMS system operating in a desired manner.

Furthermore, because the polling gateways of prior art systems are not distributed, but are instead implemented local to or integrated within the NMS system, the processing requirements placed on the NMS system and communication traffic between the network elements and the NMS system become undesirably high. For example, in FIG. 1, NMS 102 communicates with a plurality of network elements (e.g., $NE_1$-$NE_4$), which results in an undesirably large amount of communication traffic therebetween. This is particularly problematic considering that many of the network elements being monitored by the NMS may be located a long distance away from such NMS, which may result in increased costs (e.g., due to long-distance communication charges) for the NMS. Additionally, such communication traffic between the NMS and the monitored network elements undesirably ties up communication resources (e.g., communication lines), thereby reducing the amount of bandwidth available to others desiring to communicate utilizing such communication resources. As one example, suppose that NMS 102 of FIG. 1 polls the various network elements $NE_1$-$NE_4$ by communicating with such network elements over the Internet. Thus, such polling may result in undesirable traffic across the Internet, thereby negatively effecting the ability of other users attempting to communicate via the Internet.

Additionally, the architecture utilized for implementing traditional NMSs, including polling gateways, of the prior art are burdensome on system administrators desiring to customize the operation of such NMSs. More specifically, such prior art NMSs typically require relatively complex, low-level software code to be written in order for a system administrator to customize the NMS's operation to his/her desires. For instance, prior art systems proposing to enable a user to define and implement a state-based polling model on the NMS requires the user to write relatively complex, low-level software code, such as CC++ programming code to achieve the desired state-based polling. Therefore, the environment and/or interface provided to users in such prior art systems do not allow a user to easily define and implement a desired state-based model.

Furthermore, prior art systems do not allow for dynamic implementation/alteration of state-based polling models. That is, prior art systems typically require system down time to enable any addition, deletion, or alteration of a state-based polling model. If a user desires to define a new state for a network element, remove a defined state for a network element, add/delete a transition, modify a condition to trigger a transition, or modify actions to be triggered upon the occurrence of a transition, as examples, prior art systems require that a user stop/pause the NMS, write/install the necessary software code to implement the desired change(s), and then restart the NMS. Thus, a user is unable to dynamically modify the state-based polling model in prior art systems, and requiring system down time for modifying such state-based polling is undesirable to administrators.

Also, the transition actions available to users in prior art systems are very limited. For example, actions that may be taken upon the occurrence of a transition within prior art state-based polling models are generally limited to changing the polling interval, generating user alerts, and logging data about the transition. In many instances a user may desire to have some other action(s) triggered upon a state transition, which are not available in prior art systems. As examples, a user may desire to configure a network element (e.g., configure an interface) a particular way upon a state transition or have a particular service activated (e.g., to allocate/activate particular resources) upon a state transition, and such actions are typically not available to a user in prior art systems. Also, a user may benefit from having a well-defined API, in order to define new customized actions such as trouble ticket generation, advanced correlation, etcetera. Such an API is lacking from typical prior art implementations.

Furthermore, prior art systems do not allow for cross-correlation between different state models. For example, while it has been proposed in the prior art to control polling based on the state of a particular network element, such prior art systems do not allow for the control of polling based on a plurality of different state models. For instance, the amount of available memory within a network element may be modeled in prior art systems using states defined therefor, and the amount of utilization of CPU of a network element may be modeled in prior art systems using states defined therefor. Furthermore, it has been proposed in the prior art that limited actions, such as changing the polling interval, may be controlled based on a state. Thus, for instance, polling for memory information may be controlled based on the state for the available memory in a network element, and polling for CPU utilization information may be controlled based on the state for the CPU utilization of a network element. However, prior art systems do not allow for correlation of different state models to control the processing of a gateway (e.g., to control the polling). Thus, continuing with the above example, prior art systems would not allow a user to specify actions to be performed by the polling gateway (e.g., changing the polling interval or take other actions, such as alerting a user) based on both the CPU state model and the memory state model combined.

There may be some instances in which an administrator may desire to have actions triggered, such as changing the polling interval or alerting the user of the condition, upon a particular pattern of states being achieved by different state models. For example, an administrator may desire to be alerted if both the CPU model achieves a particular state and the memory model achieves a particular state. Given that many state models may be executing simultaneously for managing a network, it would is desirable to be capable of triggering actions based upon a correlation between different state models, rather than being limited to only triggering actions based upon each state model individually. Thus, a desire exists for a system in which different state models can easily be correlated (e.g., to allow for state-based pattern correlation), which would allow a user to reduce the amount of alerts received at the NMS and analyze root cause of detected problems, as examples.

Prior art state-based modeling techniques do not allow for this type of control because prior art systems do not provide for cross-correlating between different state models. While correlation of state models may be utilized in other contexts within prior art systems, such prior art systems implement any such correlation in a non-distributed fashion. That is, as discussed above, the polling gateways are not distributed in prior art systems, but are instead implemented local or integrated within the NMS. Therefore, performing such state model correlation in prior art systems would not work to reduce the above-discussed processing burden or communication traffic to/from the NMS, as such state model correlation (if any) is implemented in a non-distributed fashion.

Additionally, prior art state-based polling systems typically do not allow for a user to apply a state-based model only to particular network elements being polled by a gateway, but rather apply a state-based model being executed by a polling gateway across all network elements being polled by such gateway. In some instances, an administrator may desire to apply different state models to different network elements. For example, suppose the network includes a first router (network element) in a first location (e.g., in Dallas) and the network further includes a second router (network element) in a second location (e.g., in Denver). Further suppose that a state-based model is defined for managing routers and is implemented on a prior art NMS that is used for managing the network that includes both the first and second router. Such state-based model would be applied to both routers. Prior art systems do not provide the flexibility to enable a user to specify a first state model that is to be used for managing the first router and a second state model that is to be used for managing the second router. To apply a different state model to the first and second routers in prior art systems, a user would have to implement different gateways (or different NMS systems) for each of such routers. Therefore, the flexibility of state-based management proposed in the prior art is very limited.

Another shortcoming of prior art state-based polling systems is that they do not utilize "violation counters" to control state transition. For example, suppose a state model is defined for a network element, that includes a "normal" state and "failure" state. The state model may utilize the "normal" state to indicate that the network element is responsive to polls (e.g., the network element is operational) and may utilize the "failure" state to indicate that the network element is not responsive to polls. In some circumstances, the network element may not respond to a poll, even though the network element is operational and capable of responding. For instance, the network element may be busy and unable to immediately respond to the poll. However, the network element may respond to a later received poll, e.g., a second or third received poll. In prior art systems, once the network element fails to respond to the first poll, the state transitions from "normal" to "fault" and may trigger the actions associated with such transition, e.g., changing the poll interval and alerting the user of such condition. Upon a second poll, the network element may respond, thereby causing a transition back to the normal state. It should be recognized that the transition to "fault" and the triggering of the associated actions may be considered unnecessary in this case because the network element had not actually failed but was only delayed in responding. Thus, it may be desirable for an administrator to specify that a transition is to occur from one state to another only upon the occurrence of a particular number of "violations." For instance, continuing with the above example, an administrator may desire to trigger a transition only if the network element fails to respond to three consecutive polls. Prior art systems do not provide an administrator the ability to utilize such "violation counters" for controlling state transitions, which further limits the flexibility of prior art state-based modeling systems.

SUMMARY OF THE INVENTION

The present invention is directed to a system and method which utilize a state model for managing a communication network. More specifically, a system and method are disclosed which utilize a state model for managing one or more network elements based, at least in part, on a determined state of such network elements. A preferred embodiment enables a user to define a state model using, for example, a graphical user interface. In a preferred embodiment, a user may define one or more poll services that include state model(s). Such poll services may comprise multiple state models therein to be simultaneously executed, much as a bus is capable of transporting multiple passengers simultaneously, which enables efficient operation of such state models.

A most preferred embodiment provides a central management system that is communicatively coupled to one or more distributed polling gateways. A user may define state models and/or polling services on the central management system, and such state models/polling services are then pushed out to the distributed polling gateways for execution thereon, thus relieving much of the processing burden from the central network management system. Furthermore, the distributed polling gateways may execute the user-defined state models/polling services to effectively filter data for the central management system. That is, only data that satisfies a user-defined state model needs to be communicated to the central management system for processing, thereby further relieving the processing burden of the central management system, as well as reducing the amount of communication traffic to/from the central management system.

In a preferred embodiment, a user may define one or more polling service conditions that the polling gateways will utilize to determine whether a particular polling service should be executed. For example, a user may specify that a polling service is to be executed only for a particular type of network elements (e.g., routers). The polling service may then be distributed to all polling gateways, and only those for which the defined polling service condition is satisfied will execute the polling service. Likewise, a user may define one or more state model conditions that the polling gateways will utilize to determine whether a particular state model should be executed. For example, a user may specify that a state model is to be executed only for a particular type of network element (e.g., routers located in Dallas. The state model may then be distributed to all polling gateways, and only those for which the defined state model condition is satisfied will execute the state model.

Within a state model, a user may define various states, various state transition conditions, and various transition actions. In a preferred embodiment, the polling gateway polls the network elements to determine whether one or more user-defined state transition conditions are satisfied. If determined that a state transition condition is not satisfied by a network element, then the network element's state remains unchanged. However, if determined that a state transition condition is satisfied by the network element, then a state transition for the network element may be triggered. In a most preferred embodiment, a user may define a number of consecutive polls for which the transition condition must be satisfied before the transition is actually triggered, thus avoiding unnecessary state transitions.

Upon the polling gateway determining that a state transition is proper, the state of the network element is transitioned, and user defined transition actions for such state transition are triggered in response thereto. Examples of such transition actions include: generating a user alert, clearing a user alert, starting particular services for a network element, stopping particular services for a network element, changing the interval utilized to poll a network element, enabling a particular poll service for a network element, disabling a particular poll service for a network element, enabling a particular state model for a network element, disabling a particular state model for a network element, triggering one or more user-defined commands to be executed, triggering communication of an email message to personnel, triggering a page of personnel, logging achievement of the transition of states to a file, and performing network element configuration.

A most preferred embodiment, further enables a user to not only implement various state models to manage network elements, but further enables cross-correlation of such state models in managing network elements. For example, a user may effectively define a pattern of states of various different state models which when achieved triggers particular actions. For example, two state models may be defined each having states "high," "medium," and "low." A user may define a state "pattern," such as the first state model having state high while the second state model simultaneously has state low, and upon such pattern being achieved, user-defined actions may be triggered.

Additionally, a most preferred embodiment enables a user to dynamically define/modify polling services and/or state models during runtime. Thus, a user is not required to stop and restart the management system in order to activate polling services and/or state models, but can instead dynamically implement desired polling services and/or state models within the system during the system's runtime.

It should be understood that the term network "management system" (MS) may be utilized herein for conciseness, and is intended to broadly encompass EMSs, NMSs, OSSs, as well as other types of network management systems, such as service management systems (SMSs) and business management systems (BMSs). It should be further understood that one implementation of a preferred embodiment of the present invention provides a method for providing advanced application functionality for SNMP management applications, utilizing user-defined resource state models. For instance, operational measurements (or trap events) from a network resource result in state transitions that are maintained in the management application state model. Application behavior, such as polling cycle time for a certain type of operational measurement (poll function), or which operational measurement(s) to obtain can be tied to each state. Furthermore, such implementation allows the user to define and alter these state model definitions at run-time using a graphical user interface (GUI).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which:

FIGS. 7A-7C show a plurality of exemplary state models that may be cross-correlated according to a preferred embodiment of the present invention;

FIG. 8 shows an exemplary flow diagram of the operation of a gateway in performing state-based polling according to a preferred embodiment of the present invention;

DETAILED DESCRIPTION

A preferred embodiment of the present invention utilizes state models to manage network element(s) based upon the operational state of such network element(s) or upon its transition from one state to another state. As described in greater detail hereafter, a preferred embodiment enables a user (e.g., a system administrator) to define state model(s) to be utilized in managing network element(s) of a communication network. Additionally, a preferred embodiment enables a user to define polling service(s) that include one or more state models, and in a most preferred embodiment the polling service(s)/state model(s) are executed on distributed gateways that communicatively coupled to a central MS.

Figure 3A:
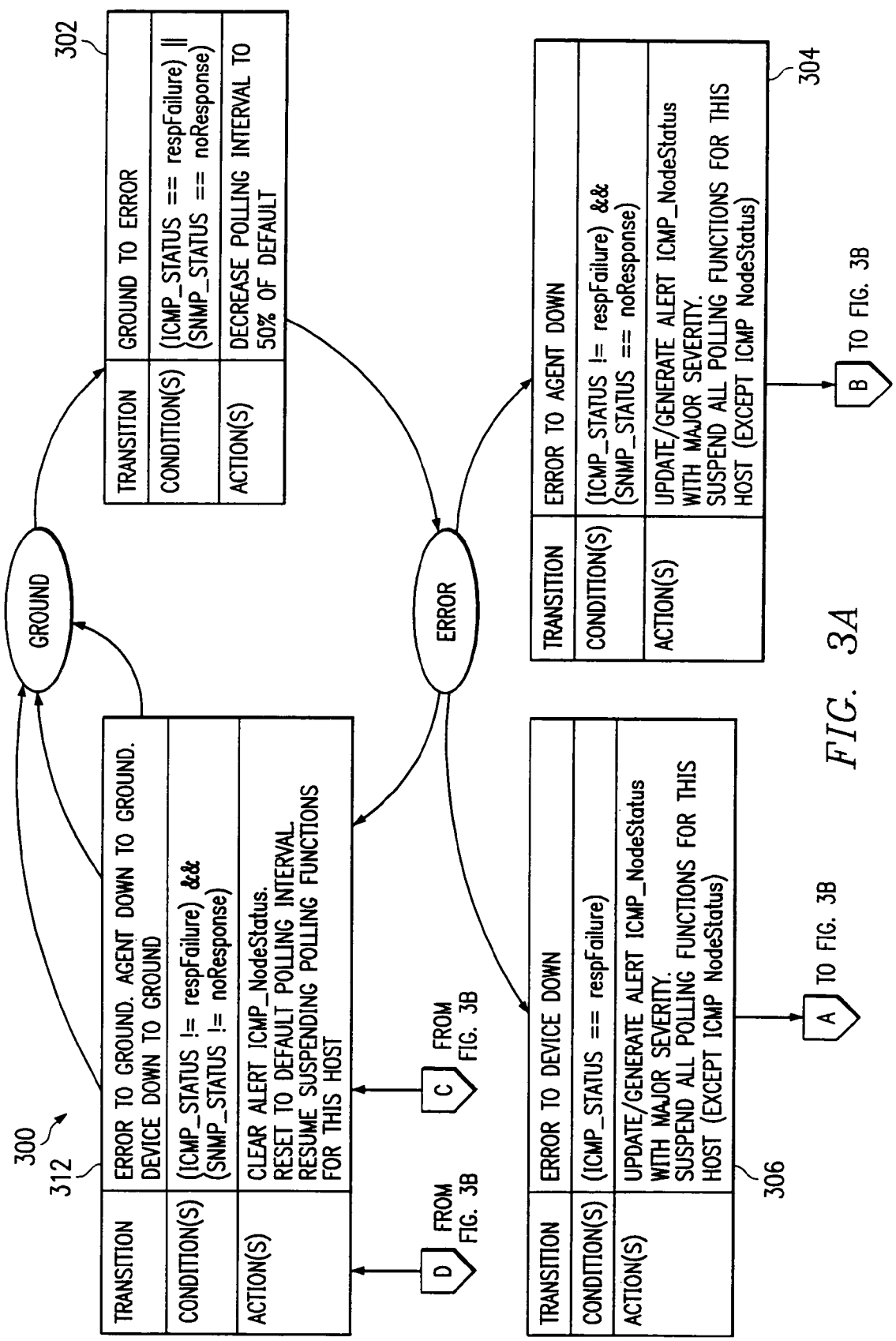
FIGS. 3A-3B show an example of a specific state model that may be defined in a preferred embodiment of the present invention.
Figure 3B:
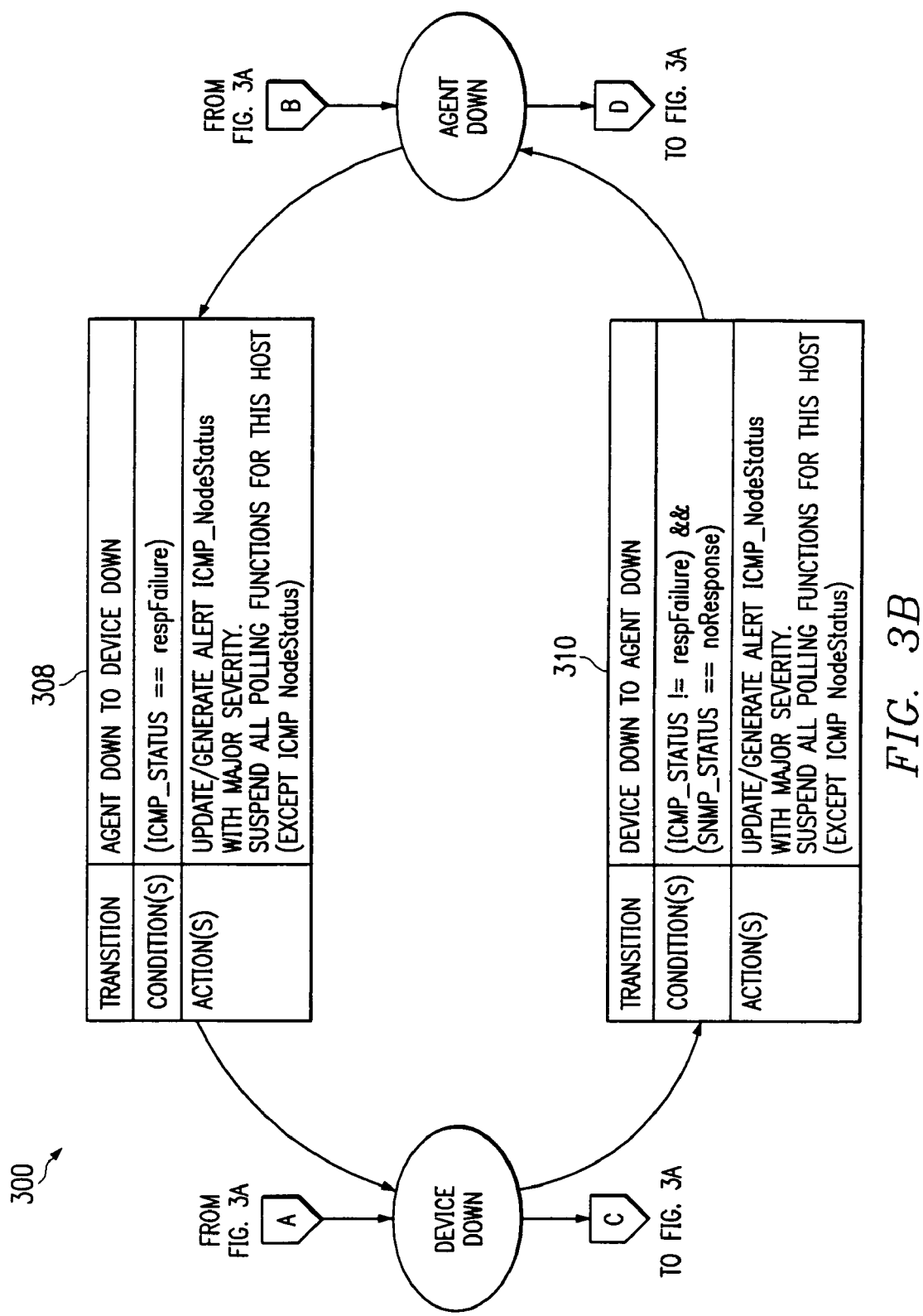

Examples of specific state models that may be defined in a preferred embodiment are shown in FIGS. 3A-3B and 4A-4B. FIGS. 3A-3B show an exemplary state model 300 for monitoring the state of the IP layer and SNMP agent using ICMP echo and SNMP Get commands. It should be understood that in this instance, IP layer refers to the network layer (the third layer) in the well known Open Systems Interconnection 7-layer model. Furthermore, in this instance, SNMP is based on layers 3 and 4 (the transport and network layers) of the well known Open Systems Interconnections 7-layer model. Thus, a SNMP device (network element) is always an IP device. However, an IP device does not have to support SNMP. If the network element responds to SNMP requests (UDP, IP) then it is ICMP (IP) reachable. If it does not respond to SNMP messages, then either the SNMP agent is down, or it is not supporting SNMP, or the network element is ICMP unreachable.

As shown in FIGS. 3A-3B, four states have been defined in state model 300 for a network element, specifically: Ground, Error, Agent Down, and Device Down. Typically, when attempting to communicate with a network element to determine whether such network element is operational and responsive, a gateway communicates with an agent (e.g., software process) executing on such network element device. If a response is not achieved from the network element, it could be that the device itself is operational, but the agent is not operational, or it could be that the device itself is actually down. Thus, the exemplary state model of FIGS. 3A-3B defines a Ground state for a network element that is operational and responsive. The network element's state becomes Error when it is determined by the gateway as not responsive. The network element's state becomes Agent Down when it is determined by the gateway that the network element is not responsive because its agent process is not operational, and the network element's state becomes Device Down when it is determined by the gateway that the network element itself is down.

Accordingly, when a network element is operational and responsive its state is Ground. As shown, a transition has been defined from "Ground to Error" (as shown in block 302), and a condition has been defined for the Ground to Error transition, which when true will cause the network element's state to transition from Ground to Error and will cause the actions defined for the Ground to Error transition (e.g., decrease polling interval to 50% of default) to be executed. More specifically, the Ground to Error transition will be triggered when condition (ICMP_STATUS==respFailure)|| (SNMP_STATUS==noResponse) is satisfied, which will be satisfied when either no response is received for the ICMP status or no response is received for the SNMP status.

A transition has been defined from "Error to Agent Down" (as shown in block 304), and a condition has been defined for the Error to Agent Down transition, which when true will cause the network element's state to transition from the Error state to the Agent Down state and will cause the actions defined for the transition (e.g., update/generate alerts and suspend polling functions except for ICMP NodeStatus) to be executed. More specifically, the Error to Agent Down transition will be triggered when condition (ICMP_STATUS != respFailure)&&(SNMP_STATUS==noResponse) is satisfied, which will be satisfied when a response is received for the ICMP status and no response is received for the SNMP status. Similarly, a transition has been defined from "Error to Device Down" (as shown in block 306), and a condition has been defined for the Error to Device Down transition, which when true will cause the network element's state to transition from the Error state to the Device Down state and will cause the actions defined for the transition (e.g., update/generate alerts and suspend polling functions except for ICMP NodeStatus) to be executed. More specifically, the Error to Device Down transition will be triggered when condition (ICMP_STATUS==respFailure) is satisfied, which will be satisfied when no response is received for the ICMP status.

A transition has been defined from "Agent Down to Device Down" (as shown in block 308), and a condition has been defined for the Agent Down to Device Down transition, which when true will cause the network element's state to transition from the Agent Down state to the Device Down state and will cause the actions defined for the transition (e.g., update/generate alerts and suspend polling functions except for ICMP NodeStatus) to be executed. More specifically, the Agent Down to Device Down transition will be triggered when condition (ICMP_STATUS==respFailure) is satisfied, which will be satisfied when no response is received for the ICMP status. Similarly, a transition has been defined from "Device Down to Agent Down" (as shown in block 310), and a condition has been defined for the Device Down to Agent Down transition, which when true will cause the network element's state to transition from the Device Down state to the Agent Down state and will cause the actions defined for the transition (e.g., update/generate alerts and suspend polling functions except for ICMP NodeStatus) to be executed. More specifically, the Device Down to Agent Down transition will be triggered when condition (ICMP_STATUS !=respFailure) &&(SNMP_STATUS==noResponse) is satisfied, which will be satisfied when a response is received for the ICMP status and no response is received for SNMP status.

Transitions have also been defined (as shown in block 312) for "Error to Ground," "Device Down to Ground," and "Agent Down to Ground," and a condition has been defined for such transitions, which when true will cause the network element's state to transition to the Ground state and will cause the actions defined for the transition (e.g., clear alerts, resume default polling interval, and resume suspended polling functions) to be executed. More specifically, the transition from any of the non-Ground states to Ground will be triggered when condition (ICMP_STATUS !=respFailure)&& (SNMP_STATUS !=noResponse) is satisfied, which will be satisfied when a response is received for the ICMP status and a response is received for the SNMP status.

Figure 4A:
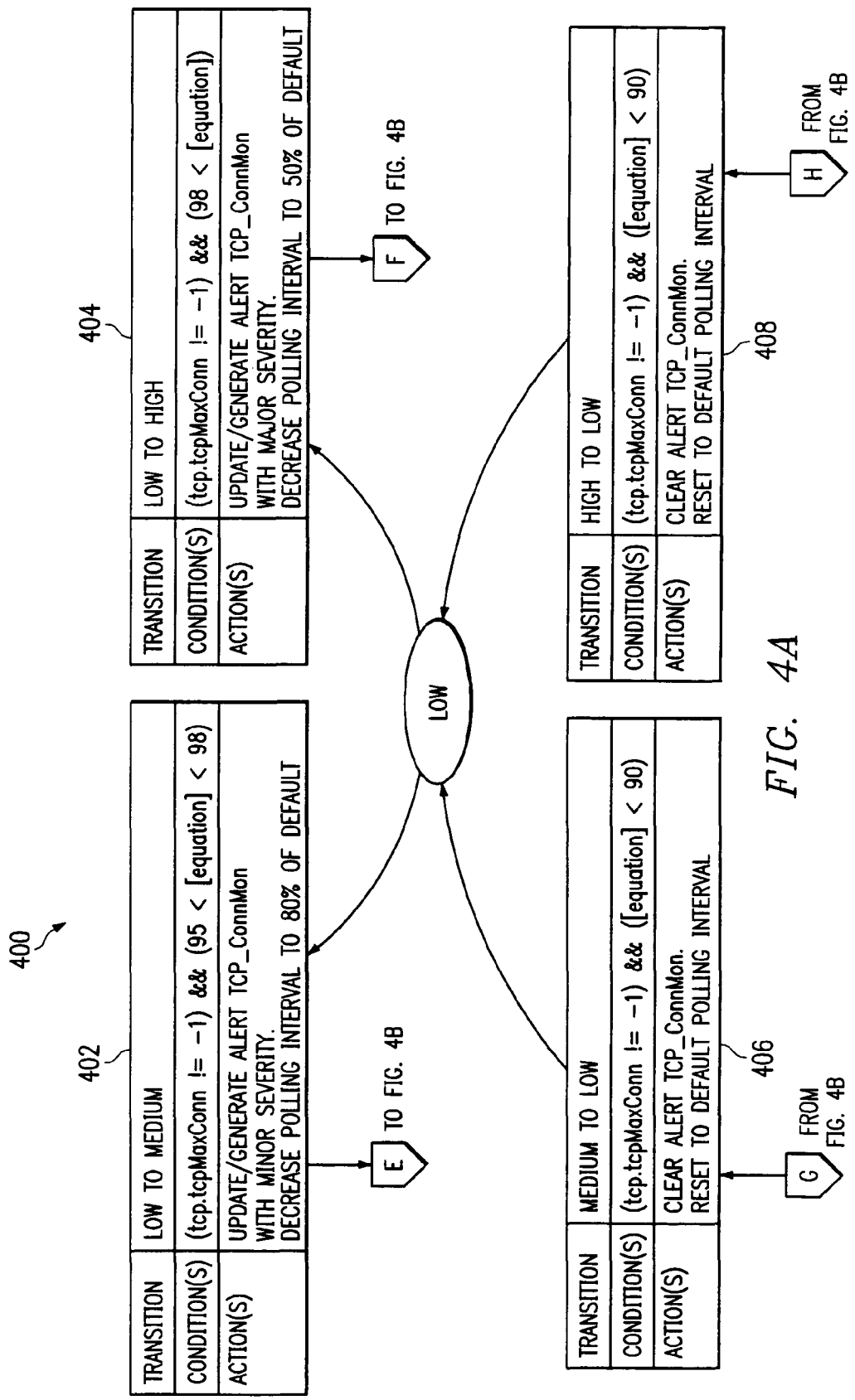
FIGS. 4A-4B show another example of a specific state model that may be defined in a preferred embodiment of the present invention.
Figure 4B:
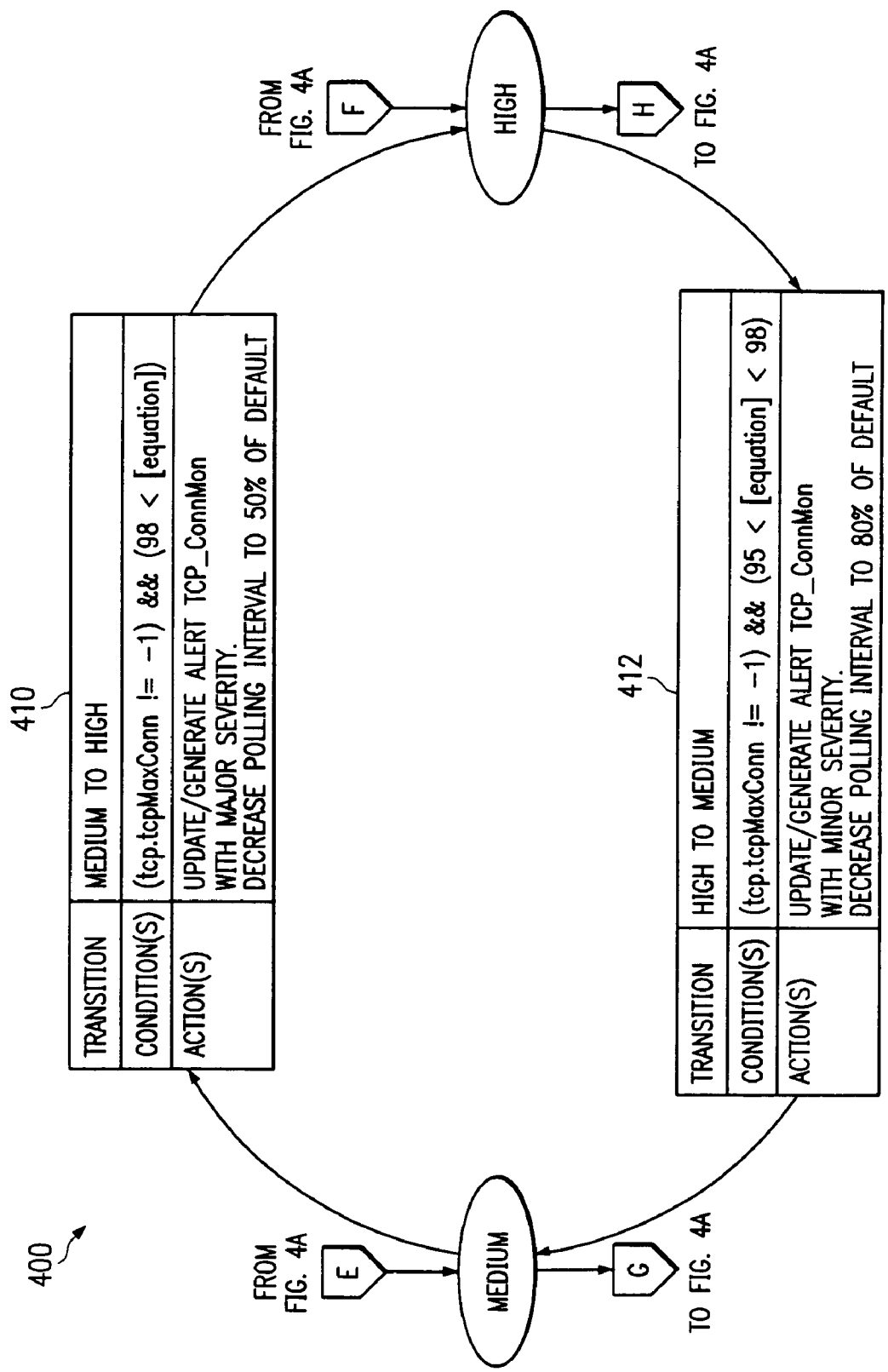

FIGS. 4A-4B show an exemplary state model 400 for monitoring the percentage of TCP connections. In this case, percentage of TCP connections is defined as:

$$\left(\frac{\text{Current } TCP \text{ Connections}}{\text{Maximum } TCP \text{ Connections}}\right) \times 100$$

thus referring to the ratio of used TCP connections against all possible TCP connections. As shown, three states have been defined in state model 400 for a network element, specifically: Low, Medium, and High. More specifically, in this example, the network element's state becomes Low when the TCP connection percentage is less than 90%. It will be recalled from the above equation that when the percentage is 100% indicates that all possible connections are used and no further connections are available, which can be a critical problem. The network element's state becomes Medium when the percentage of connections is between 95% and 98%. Such medium state could be a warning sign to the network administrator that only a relatively small percentage of TCP connections are available. The network element's state becomes High when the TCP connection percentage is greater than 98%, which could be/become a significant problem.

Accordingly, when the number of TCP connections is less than 90% of the maximum allowed, its state is Low. As shown, a transition has been defined from "Low to Medium" (as shown in block 402), and a condition has been defined for the Low to Medium transition, which when true will cause the state to transition from Low to Medium and will cause the actions defined for such transition (e.g., update/generate alerts with minor severity and decrease polling interval to 80% of default) to be executed. More specifically, the Low to Medium transition will be triggered when condition (tcp.tcpMaxConn !=−1)&&(95<[equation]<98) is satisfied, which will be satisfied when the connection percentage is in between 95% and 98%. It should be recalled that the "[equation]" referred to in the condition of this example is provided above for calculating the TCP connection percentage.

A transition has been defined for "Low to High" (as shown in block 404), and a condition has been defined for the Low to High transition, which when true will cause the state to transition from the Low state to the High state and will cause the actions defined for the transition (e.g., update/generate alerts with major severity and decrease polling interval to 50% of default) to be executed. More specifically, the Low to High transition will be triggered when condition (tcp.tcpMaxConn !=−1)&&(98<[equation]) is satisfied, which will be satisfied when the TCP connection percentage is greater than 98%. Similarly, a transition has been defined from "Medium to High" (as shown in block 410), and a condition has been defined for the Medium to High transition, which when true will cause the state to transition from the Medium state to the High state and will cause the actions defined for the transition (e.g., update/generate alerts with major severity and decrease polling interval to 50% of default) to be executed. More specifically, the Medium to High transition will be triggered when condition (tcp.tcpMaxConn !=−1)&& (98<[equation]) is satisfied, which will be satisfied when the TCP connection percentage is greater than 98%.

A transition has been defined from "High to Medium" (as shown in block 412), and a condition has been defined for the High to Medium transition, which when true will cause the state to transition from the High state to the Medium state and will cause the actions defined for the transition (e.g., update/generate alerts with minor severity and decrease polling interval to 80% of default) to be executed. More specifically, the High to Medium transition will be triggered when condition (tcp.tcpMaxConn !=−1)&&(95<[equation]<98) is satisfied, which will be satisfied when the TCP connection ratio is between 95% and 98%.

Transitions have also been defined (as shown in blocks 406 and 408) for "Medium to Low" and "High to Low," and a condition has been defined for such transitions, which when true will cause the state to transition to the Low state and will cause the actions defined for the transition (e.g., clear alerts and resume default polling interval) to be executed. More specifically, the transition from any of the non-Low states to Low will be triggered when condition (tcp.tcpMaxConn !=−1)&&([equation]<90) is satisfied, which will be satisfied when the TCP connection ratio is less than 90%.

It should be understood that the state models of FIGS. 3A-3B and 4A-4B are intended solely as examples of how state models may be defined within a preferred embodiment. More specifically, the states, transitions, conditions, and actions described with FIGS. 3A-3B and 4A-4B are intended solely as examples, and state models may be implemented having states, transitions, conditions, and actions other than those shown in FIGS. 3A-3B and 4A-4B. Thus, the present invention is not intended to be limited only to the types of state models shown in FIGS. 3A-3B and 4A-4B, but are intended to encompass any type of state model that a user may desire to implement.

Figure 5:
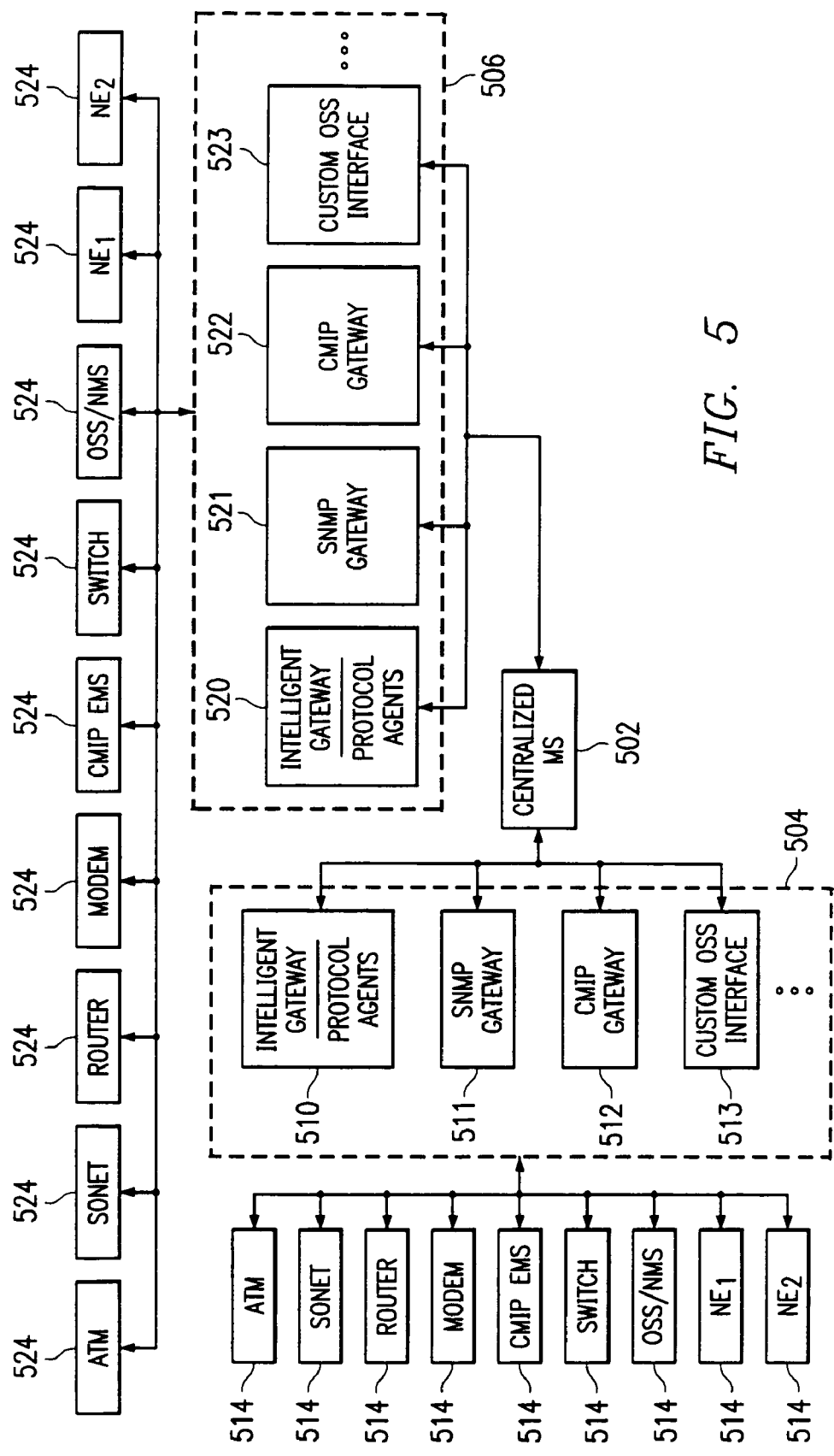
FIG. 5 shows an exemplary management system of a preferred embodiment implemented with distributed polling gateways.

A most preferred embodiment utilizes gateways that are distributed as shown in FIG. 5, wherein state models may be defined/altered by a user (e.g., system administrator) at a central MS and then pushed out to the distributed gateways. For instance, state models may be defined/altered by a user at a centralized MS and then pushed out to one or more distributed gateways via a suitable communication network that communicatively couples the centralized MS to such distributed gateways. As shown in FIG. 5, central MS 502 may be communicatively coupled to numerous gateways distributed about the network for managing various network elements. For instance, an example of distributed gateways that may be utilized in a preferred embodiment is shown in FIG. 5. As shown, central MS 502 may be communicatively coupled to distributed gateways or groups of distributed gateways. For example, group 504 may be implemented at one geographic location of a network and group 506 may be implemented at another geographic location of such network. Group 504 may include various gateways for monitoring (e.g., polling) particular types of network elements (e.g., each may monitor network elements having particular communication protocols, including as examples intelligent gateway 510, SNMP gateway 511, CMIP gateway 512, and custom OSS interface gateway 513, which may monitor various network elements 514, such as ATMs, Sonets, routers, modems, CMIP EMSs, switches, OSSs/NMSs, as well as various other network elements local to group 504. Likewise, group 506 may include various gateways for monitoring (e.g., polling) particular types of network elements (e.g., each may monitor network elements having particular communication protocols, including as examples intelligent gateway 520, SNMP gateway 521, CMIP gateway 522, and custom OSS interface gateway 523, which may monitor various network elements 524, such as ATMs, Sonets, routers, modems, CMIP EMSs, switches, OSSs/NMSs, as well as various other network elements local to group 506.

In a preferred embodiment, data collected by the distributed polling gateways may be communicated to the centralized MS. More specifically, polling services (which include state models) may be loaded onto the distributed gateways, and such gateways may execute the polling services and state models to monitor their respective network elements. In this manner, the gateways can act as filters by only communicating necessary data about the network elements back to the central MS, thereby alleviating much of the processing and communication traffic burden from the central MS.

Figure 6:
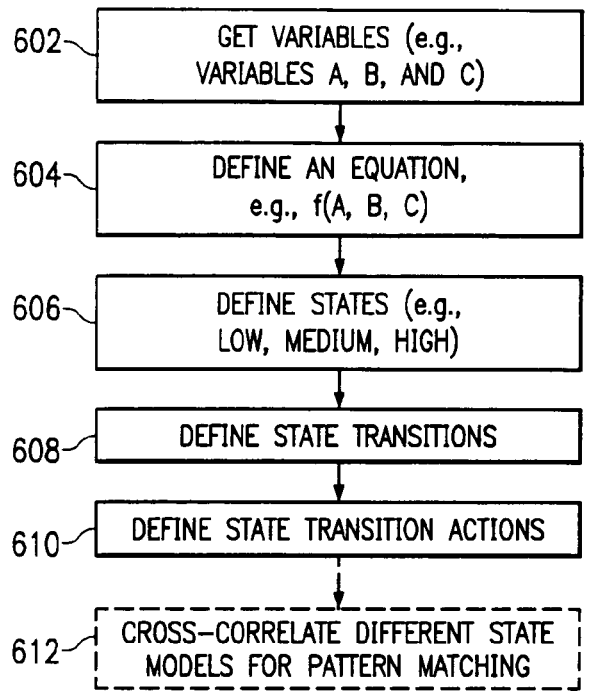
FIG. 6 shows an exemplary flow diagram for the process of defining a state model according to a preferred embodiment of the present invention.

An exemplary flow diagram for the process of defining a state model according to a preferred embodiment is shown in FIG. 6. Most preferably users may interact with a user-interface, such as a graphical user interface (GUI), executing on the central NMS of FIG. 6 to define a state model, which is then distributed to the appropriate gateway(s) for execution thereon. An example of such a GUI that may be presented to enable a user to define a state model according to a preferred embodiment of the present invention is described more fully hereafter in conjunction with FIGS. 9A-9E. As shown in the exemplary flow diagram of FIG. 6, the process of defining a state model may begin at block 602, wherein a user (e.g., a system administrator) identifies the variables needed for defining the desired state model, such as variables A, B, and C. As an example, suppose a user is defining a state model for the memory of a network element, memory variables, such as amount of available memory, would be used for defining the desired state model. For instance, any type of raw data that may be collected from a network element may be included as a variable. The types of variables that may be available for various network elements may be available to the user in documentation from the vendor/manufacturer of such network elements, as examples. Thus, once the user determines how he/she desires to manage the network elements through state-based polling, the user determines the variables needed for constructing state model(s) for achieving the desired management.

Figure 1:
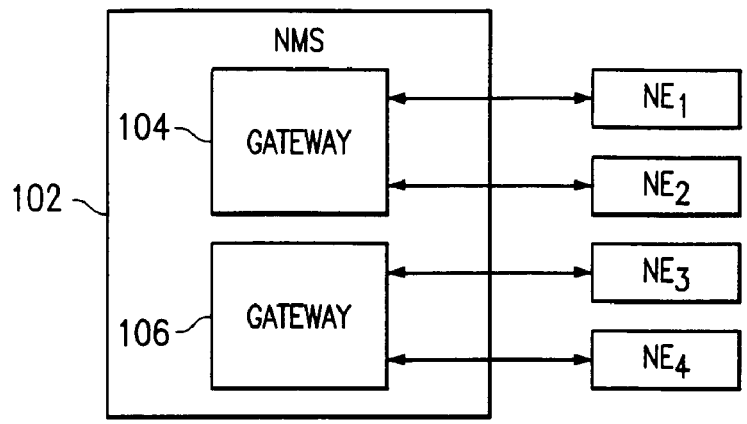
FIG. 1 shows an exemplary implementation of a prior art network management system.
Figure 2:
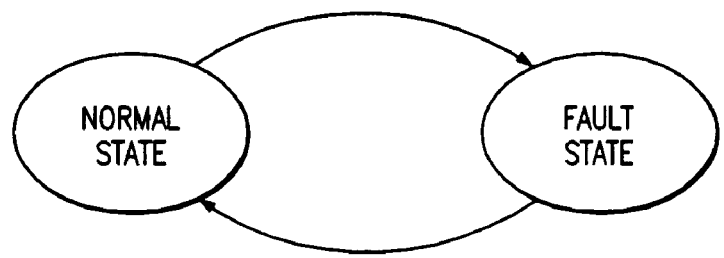
FIG. 2 shows a relatively simple example of a state-based approach to polling.

After determining the variables to be used in defining the state model, the user defines an equation in block 604, such as f(A,B,C). The defined equation can be used for defining a transition condition as well as for generating useful performance/trend reports. In block 606, the user defines the state names, such as "Low," "Medium," "High," as examples, or to use the exemplary state names of FIG. 2 the user may define "Normal" and "Fault."

In block 608, the user defines state transitions to be included within the state model. As an example, suppose that in block 606 the user defines states "Low," "Medium," and "High." The user, in block 608, may define a transition from Low to Medium being triggered upon a particular condition being satisfied. For instance, the user may define a transition from Low to Medium as being triggered when f(A,B,C)>50, as an example. The user may define the transitions as desired, and a transition may or may not be defined for transitioning between each and every state. For instance, in addition to defining a transition from Low to Medium, the user may define a transition from Medium to High, but a user may or may not define a transition from Low to High.

In block 610, the user defines state transition actions, which are the actions to be triggered upon the occurrence of a state transition. For example, the user may define particular actions to be triggered upon a transition from Low to Medium. Similarly, if the user defines, in block 608, a transition from Medium to High, particular actions may be triggered upon this transition. A preferred embodiment enables a user to specify any of many different transition actions to be defined. Examples of such transition actions that may be available in a preferred embodiment are discussed in greater detail hereafter. As a relatively simple example of transition actions that may be defined in block 610, a user may define that a user alert having minor severity is to be generated upon a transition from Low to Medium, and a user alert having major (or critical) severity is to be generated upon a transition from Medium to High.

As further shown, a preferred embodiment may be implemented to enable a user to define a cross-correlation between different state models. For instance, in block 612 the user may cross-correlate different state models for pattern matching, which is described in greater detail hereafter in conjunction with FIGS. 7A-7C. Of course, this block is optional (and therefore is shown in broken lines in FIG. 6), as a user may or may not desire to cross-correlate between defined state models.

Figure 7A:
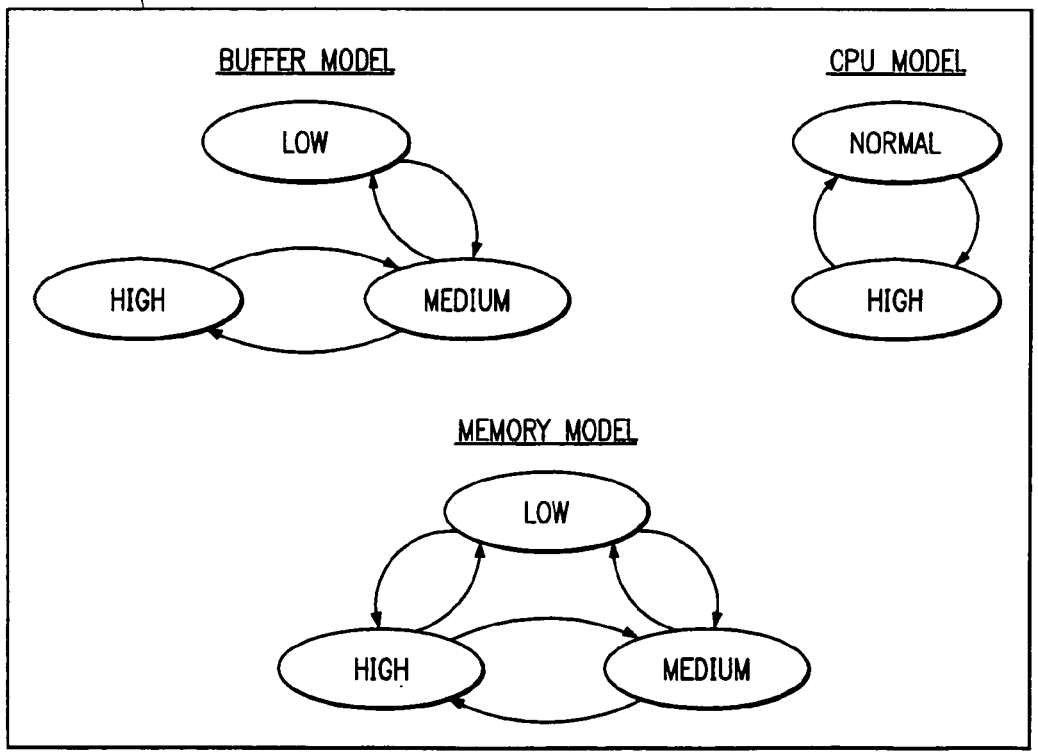

As shown in FIG. 7A, in a preferred embodiment, various state models may be implemented on a polling gateway for monitoring one or more network elements. In FIG. 7A, three exemplary state models are shown, which may all be executing on a polling gateway 700. The first exemplary state model is a buffer model that is utilized to specify the state of a network element's buffer (e.g., depending on how full the buffer is). Such buffer state model includes three states that have been defined for the buffer: low, medium, and high. The second exemplary state model is a CPU model that is utilized to specify the state of a network element's CPU (e.g., depending on the utilization of the CPU). Such CPU state model includes two states that have been defined for the CPU: normal and high. The third exemplary model is a memory model that is utilized to specify the state of a network element's memory (e.g., depending on the amount of available memory). Such memory state model includes three states that have been defined for the memory: low, medium, and high. The state transitions that have been defined for each of the exemplary state models are also shown in FIG. 7A, as indicated by the arrows between the defined states within each model.

As described above, transition actions may be defined for transitions within each of the state models. Additionally (or alternatively), an action may be defined for pattern-matching between a plurality of different state models. That is, such a pattern-matching action may be defined by a user to be triggered based on cross-correlation between a plurality of different state models. Thus, a pattern-matching action may be triggered upon certain states being achieved in a plurality of different state models. Examples of pattern-matching state models that may be defined by a user for the exemplary state models of FIG. 7A are shown in FIGS. 7B and 7C. The exemplary pattern-matching model of FIG. 7B is defined as having a name of "Pattern 1," and a condition that specifies when the pattern is achieved. For instance, Pattern 1 is defined as being achieved when the CPU and memory states are high and the buffer state is medium. Also, actions are defined, which are triggered upon the defined pattern being achieved (i.e., upon the pattern condition becoming true). For instance, upon Pattern 1 being achieved, an alert having minor severity is generated.

Similarly, the exemplary pattern-matching model of FIG. 7C is defined as having a name of "Pattern 2," and a condition that specifies when the pattern is achieved. For instance, Pattern 2 is defined as being achieved when the CPU state, memory state, and buffer state are all high. Also, actions are defined, which are triggered upon the defined pattern being achieved (i.e., upon the pattern condition becoming true). For instance, upon Pattern 2 being achieved, an alert having major severity is generated. Additionally, particular services may be started, such as causing additional memory and CPU resources to be allocated to the network element, and particular services may be stopped, e.g., unnecessary applications executing on the network element may be stopped to preserve the network element's processing, memory and/or buffer resources.

It may be very advantageous to allow for such cross-correlation between different state models in a preferred embodiment. One advantage that may be recognized through such cross-correlation is a reduction in the amount of processing and communication traffic to the central MS. As described above, a preferred embodiment utilizes distributed gateways for performing state-based polling, and use of such cross-correlation may enable an administrator to "filter" information about the network elements at the gateways to reduce the amount of communication traffic to the central MS, as well as the amount of processing required at the central MS. For example, if the exemplary pattern-matching model of FIGS. 7B and 7C were executing on the central MS, it would require that the polling gateways communicate state information collected for the CPU, memory, and buffer state models to the central MS so that the central MS could determine whether a pattern condition is satisfied (which would require increased processing at the central MS and increased communication traffic to the central MS). However, in a preferred embodiment, such pattern-matching model executes on distributed gateways, which may generate alerts to the central MS or trigger other actions once the gateways determine that a defined pattern has been matched, thus relieving the central MS of the processing associated with such pattern model and reducing the amount of communication traffic to the central MS.

Of course, such pattern-matching could be further extended to enable a user to define a pattern of patterns. For example, a user could define that certain actions are to be triggered when a first defined pattern of states is achieved for a first network element and a second defined pattern is achieved for a second network element. Any number of levels of such correlation between state patterns may be defined by a user, thereby further increasing the flexibility of a preferred embodiment.

As described above in conjunction with FIG. 5, in a most preferred embodiment the state model is defined (using, for example, the process of FIG. 6) at the central MS, and is then pushed out to distributed gateways for execution thereon. Turning now to FIG. 8, an exemplary flow diagram showing the operation of a gateway in performing state-based polling according to a preferred embodiment is shown. That is, an exemplary process flow for executing a defined polling service for performing one or more defined state models at a gateway is shown. As described in greater detail herein, a "poll service" may include one or more state models, and such poll service is executable to perform the state models included therein. A poll service of a preferred embodiment is analogous to a bus in that a poll service may include a plurality of different state models needing to be executed, just as a bus may transport a plurality of different people.

As shown in FIG. 8, the poll service is started in block 802. The poll service may be started (or triggered) in many ways. As examples, the poll service may be periodically triggered according to a polling interval active for the model (which may vary depending on the network element's state), the poll service may be triggered by the occurrence of a particular event (e.g., a user may specify to trigger a poll upon the occurrence of a particular event, such as a particular fault occurring), and a user may interact with a user interface (e.g., a the central MS in a preferred embodiment) to manually trigger the poll.

In a preferred embodiment, a poll service activation condition may be defined by a user, such that the poll service is activated only if the activation condition is satisfied. Thus, a preferred embodiment allows for a two-layered approach, wherein a poll service may be activated (if its activation condition is satisfied), and upon the poll service being activated, one or more defined state models may be executed in such poll service. At operational block 804, the gateway checks the poll service activation condition. A user may specify that the poll service is to be performed only for particular types of network elements, for example. For instance, a user may specify that the defined poll service is to be performed only for routers (or only for "Cisco" devices) within the network. Thus, at block 804, the gateway determines whether it is managing one or more network elements for which the poll service activation condition is satisfied. For instance, the gateway determines whether it is managing routers (or "Cisco" devices) for which the poll service is to be activated. If it is determined that the poll service activation condition is not satisfied, execution of the poll service stops in block 806. In this manner, the gateway can filter out unnecessary network elements to which the poll service does not apply and not execute the state model(s) to poll network elements to which the poll service does not apply, thereby alleviating unnecessary processing by the gateway as well as unnecessary communication traffic between the gateway and the network elements. This further may enable more efficient allocation of state models to the gateways, for example, because rather than a user specifying the appropriate gateways for executing a defined state model (e.g., specifying gateways that manage the type of network elements to which the defined state model is directed), the defined state model may simply be sent to all of the distributed gateways, and only those that satisfy the poll activation condition will actually perform the defined poll service.

Of course, a user may not define a poll activation condition, in which case the gateway will advance its operation to block 808 just as if an activation condition were defined and determined in block 804 to be satisfied. In block 808, the gateway executes the appropriate command(s) to retrieve the needed variables defined for the state model(s) being executed. For example, the gateway may execute the appropriate SNMPGet, GetNext, or ICMP commands to poll the network element(s). Once the variable values are retrieved from the network element(s) for the state model(s), the gateway evaluates the defined state model(s) condition(s).

As described above, a user may define a condition for each state model. For instance, the user may define a particular type of device to which the state model is to be applied (e.g., routers in Dallas or routers in Denver). As an example, suppose a gateway is managing routers in Dallas (and not in Denver). Further suppose that the poll service activation condition (discussed above with block 804) specifies that the poll service is to be activated only for routers, and thus the gateway activates the poll service, which may cause two defined state models to be executed. The first state model may have a defined condition specifying that it applies only to routers in Dallas, and the second state model may have a defined condition specifying that it applies only to routers in Denver. Such state model conditions will be evaluated by the gateway executing the poll service in block 810, and will determine that only the first state model's condition is satisfied. Therefore, the gateway will stop execution of the second state model in block 812, and continue execution of the first state model by advancing its operation for such first state model to block 814.

At block 814, the gateway evaluates the equation defined for the state model. As an example, such state model equation may be defined as f(A, B, C), which is described as an exemplary equation above in conjunction with FIG. 6. More specifically, the gateway would apply the variable values received from a network element to evaluate the defined state model equation. At block 816, the state transition condition defined in the state model for the network element's current state is evaluated. For instance, the state transition condition for the network element's current state may be defined within a model as f(A, B, C)>50. If the defined transition condition is determined not to be satisfied, then the current state of the network element remains as it is, and execution of the state model stops in block 818. However, it is determined in block 816 that the transition condition is satisfied, execution of the state model advances to block 820, whereat the network element's state is changed and the defined transition actions are performed (e.g., generating alerts, changing the polling interval, etcetera). Execution of the polling service then ends in block 822. Thereafter, upon the poll service being triggered again, operation begins again at block 802.

Figure 9A:
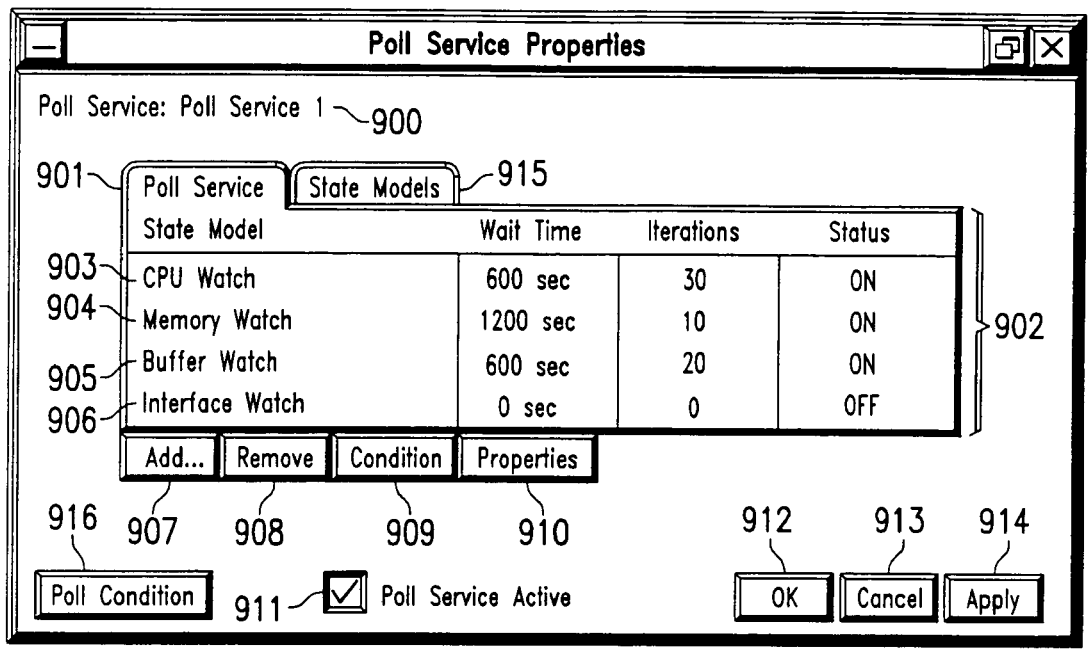
FIGS. 9A-9E show exemplary user interfaces that may presented to a user for defining and modifying polling services and state models according to a preferred embodiment of the present invention.

Turning now to FIGS. 9A-9E, an exemplary user interface that may be implemented at the central NMS for defining poll services and state models is shown. FIG. 9A shows an exemplary user interface that may be utilized by a user to create/modify a poll service for managing network element(s). As shown, a user may view and/or modify the properties of a poll service using the exemplary interface of FIG. 9A. In the example of FIG. 9A, a poll service named "Poll Service 1" (as indicated in the poll service name 900), is being displayed. As shown, the poll service tab 901 is active, and therefore the state models included within the poll service are shown. As described above, a poll service may include one or more different state models therein, and such state models are summarized in display block 902. In the example shown in FIG. 9A, four state models 903, 904, 905, and 906 are included within the poll service "Poll Service 1." Display block 902 shows the name of each state model included in the poll service, the polling interval time (or wait time) for each state model, the number of iterations for each state model (which is the maximum number of iterations that the network element will be polled each time the sate model is executed), and the status of each state model (e.g., whether the state model is turned "on" and is to be executed, or is turned "off" and is not to be executed). For instance, state models 903, 904, and 905 are shown, which may correspond to the exemplary state model shown in FIG. 7A. More specifically, "CPU watch" state model 903 is included in this poll service, and has a polling interval of 600 seconds, iterations 30, and status "on." "Memory watch" state model 904 is included in this poll service, and has a polling interval of 1200 seconds, iterations 10, and status "on." Additionally, "Buffer watch" state model 905 is included in this poll service, and has a polling interval of 600 seconds, iterations 20, and status "on."

The "Poll service 1" also includes an "Interface watch" state model, which has status "off," and therefore will not be executed by such poll service. Thus, a user may turn the status of state models within a poll service on or off to control whether the poll service is to execute the state models included therein. Given the exemplary state models 903-906 that are included in the poll service of FIG. 9A, the poll service will execute to poll the appropriate network elements every 600 seconds, wherein the CPU watch state model 903 and Buffer watch state model 905 will be executed every poll cycle (i.e., every 600 seconds) and the Memory watch state model 904 will be executed every other poll cycle (i.e., every 1200 seconds). Most preferably a user intelligently selects polling intervals for the state models included within a polling service to enable relatively efficient use of the polling service. For example, suppose two state models are defined within a polling service. Further suppose that a user defines the polling interval for the first state model as 600 seconds and the polling interval for the second state model as 601 seconds. Such an implementation may be possible, but it does not allow for the most efficient use of the polling service. That is, the polling service, as defined in this example, would execute one state model, and then one second later execute the other state model. If instead the user defined both state models as having a 600 second interval, for instance, then the polling service may execute more efficiently by performing both state models simultaneously every 600 seconds. Most preferably, the state model engine (or the polling engine) will warn the user whenever the polling intervals are not configured intelligently before its execution.

A user may modify the poll service by interacting with the interface of FIG. 9A, and particularly through utilizing buttons 907, 908, 909, and 910. For instance, a user may activate "Add" button 907 (e.g., by clicking the button with a pointer device, such as a mouse) to add another state model to the poll service. On the other hand, a user may select a particular state model (e.g., by clicking on one of the state models 903-906) and activate the "Remove" button 908 to remove such selected state model from the poll service. For instance, a user may remove Interface watch state model 906 by selecting such state model and activating button 908. As described above, a state model may only activate upon certain conditions being satisfied, and the user may define such conditions for activation of the state model by activating "Condition" button 909. For instance, a state model may be defined by a user as only applicable for router devices located in Dallas, as an example. Thus, the user may activate the "Condition"

button 909 and be presented an interface that enables the user to define such router devices located in Dallas as a condition for activation of the polling service. Also, a user may select a state model (e.g., one of state models 903-906) and activate "Properties" button 910 to be presented an interface providing more detailed information about the properties of the selected state model.

A user may activate the poll service check box 911 to activate the defined poll service. As described above, a poll service may only activate upon certain conditions being satisfied, and the user may define such conditions for the poll service by activating the "Poll Condition" button 916. For instance, the polling service may be defined by a user as only applicable for router devices, as an example. Thus, the user may activate the "Poll Condition" button 916 and be presented an interface that enables the user to define such router devices as a condition for activation of the polling service. Additionally, the user may activate the "Apply" button 914 to apply any changes to the poll service made by the user, or the "Cancel" button 913 to cancel any changes. Once the user's interaction with the poll service is complete, the user may activate the "OK" button 912.

As is further described herein, a preferred embodiment enables a user to dynamically create, modify and activate poll services during runtime of the central MS, polling gateways, and network element(s). Thus, for example, when a user activates the "Apply" button 914, a most preferred embodiment dynamically updates the poll service being executed by the polling gateways to incorporate any changes made by the user, without requiring that the gateways and/or the network element(s) be shut down and restarted.

Figure 9D:
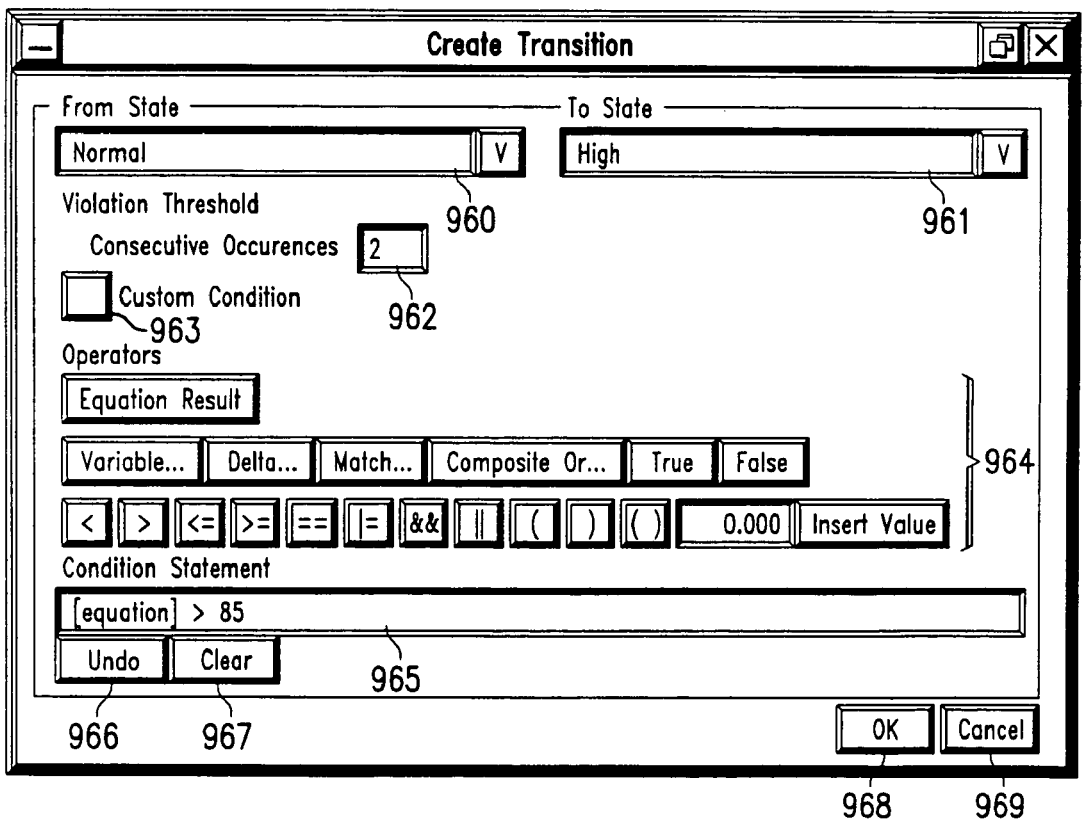
Figure 9B:
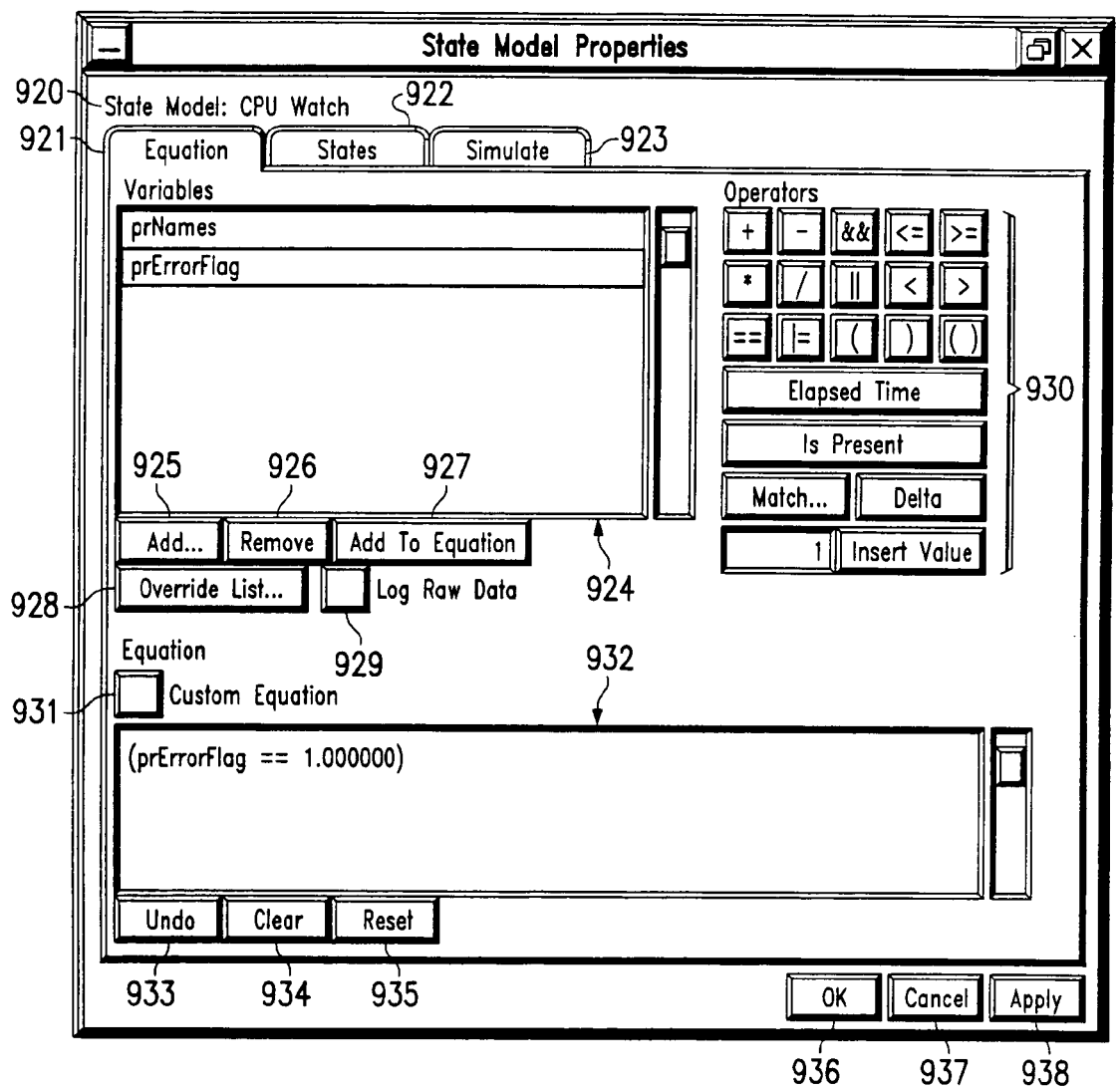

Turning to FIG. 9B, an exemplary user interface that may be utilized to enable a user to create and/or modify state models is shown, which may be presented to the user in response to a user activating the "Properties" button 910 of FIG. 9A, for example. In the example of FIG. 9B, a state model named "CPU watch" (as indicated in the state model name 920), is being displayed. Tabs 921, 922, and 923 are presented for creating/modifying the CPU watch state model. Tab 922, when activated, presents an interface for creating/modifying the states to be included within the state model, and tab 923, when activated, allows a user to simulate the state model (e.g., for testing purposes). As shown in the example of FIG. 9B, the "Equation" tab 921 is active, and therefore the equation for the state model is presented to a user. In creating a state model equation, the user may specify various variables in the display block 924, and such variables may then be used in the state model equation. More specifically, buttons 925, 926, 927, 928, and check box 929 enable a user to edit the variables to be included within a state model. For instance, "Add" button 925 may be activated by a user to add a new variable within the state model. Additionally, a user may select a variable in the state model (as displayed in variable display block 924) and activate "Remove" button 926 to remove the variable from the state model. Also, the user may select variable(s) in the state model and activate the "Add to Equation" button 927 to add the variables within the state model equation. Furthermore, a user may activate the "Override List" button 928 to create exceptions for the state model. As an example, "CPU Watch" is the state model and "CPU_Watch_CISCO" is an override (exception) state model that can have a different behavior (e.g., for CISCO devices). Thus, the override state model could apply to CISCO devices while other devices use the defined "CPU Watch" state model. A user may activate the "Log Raw Data" check box 929 to record/save raw data into any assigned database for trend analysis or performance reports, as examples.

A user may utilize various operators 930, which may include various mathematical and logical operators, in constructing a desired state model equation. The user may activate the "Custom Equation" check box 931 to define his/her custom equation. For example, this may provide a well defined API to allow the user to write his/her own logic in the equation. A state model equation display block 932 is provided, which the user the state model equation, as the user creates/modifies it. In the example shown in FIG. 9B, the user has defined two variables: prNames and prErrorFlag. Furthermore, the user has defined a state model equation: (prErrorFlag==1,000,000). To create such a state model equation, the user activated the open parenthesis operator, i.e., "(" to insert such open parenthesis into the equation (shown in block 932). The user then selected the prErrorFlag variable and activated the "Add to Equation" button 927 to insert such variable into the state model equation. The user then selected the "==" operator to be inserted into the equation and entered the value "1,000,000." Finally, the user activated the close parenthesis operator, i.e., ")" to insert such closed parenthesis into the state model equation. Of course other interfaces may enable a user to create a state model equation, and additional and/or alternative operators may be available to a user for use in creating such an equation. The exemplary user interface of FIG. 9B further provides buttons 933, 934, and 935 to aid a user in creating/modifying a state model equation. More specifically, "Undo" button 933 allows a user to undo the prior operation performed (e.g., to undo the prior entry into the equation). The "Clear" button 934 enables a user to clear the equation (which would clear the display block 932), and the "Reset" button 935 enables a user to reset the equation. A user may activate the "Apply" button 938 to apply any changes to the state model made by the user, or the "Cancel" button 937 to cancel any changes. Once the user's interaction with the state model properties interface is complete, the user may activate the "OK" button 936.

As is further described herein, a preferred embodiment enables a user to dynamically create, modify and activate state models during runtime of the central MS, polling gateways, and network element(s). Thus, for example, when a user activates the "Apply" button 938, a most preferred embodiment dynamically updates the state model being executed by the polling gateways to incorporate any changes made by the user, without requiring that the gateways and/or the network element(s) be shut down and restarted.

Figure 9C:
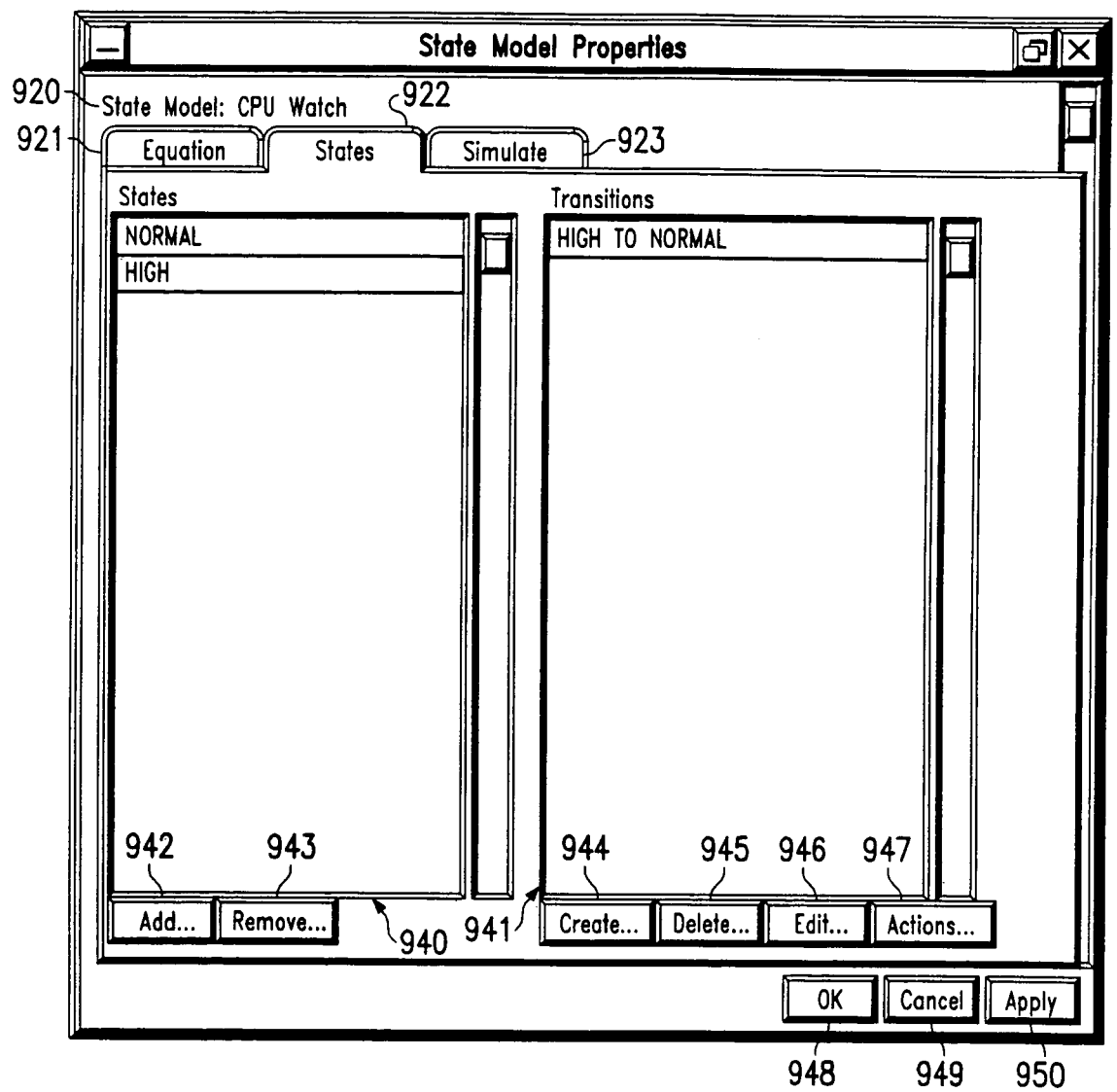

Turning to FIG. 9C, an exemplary user interface that may be utilized to enable a user to create and/or modify states (as well as transitions therebetween) within a state model is shown, which may be presented to the user in response to a user activating the "States" tab 922 of FIG. 9B, for example. In the example of FIG. 9C, as with the example of FIG. 9B, the state model named "CPU watch" (as indicated in the state model name 920), is being displayed. Tabs 921, 922, and 923 are again presented for creating/modifying the CPU watch state model. As shown in the example of FIG. 9C, the "States" tab 922 is active, and therefore the states for the state model are presented to the user in state display block 940. In the example of FIG. 9C, states "Normal" and "High" are defined for the state model (as shown in display block 940). Furthermore, the user may add additional states to the model by activating "Add" button 942, and the user may remove states from the model by activating "Remove" button 943.

Various transitions between the states may be defined, which will be presented in the transitions display block 941. In the example of FIG. 9C, a transition "High to Normal" is defined for the state model (as shown in display block 941). Furthermore, a user may create such transitions between the defined states of the state model by activating "Create" button 944. Additionally, a user may delete a transition by selecting a transition and activating the "Delete" button 945, and a user may edit a transition by selecting a transition and activating the "Edit" button 946. Furthermore, a user may define/modify actions to be triggered upon the occurrence of a transition by selecting a transition and activating the "Actions" button 947. A user may activate the "Apply" button 950 to apply any changes to the states and/or transitions made by the user, or the "Cancel" button 9949 to cancel any changes. Once the user's interaction with the state model properties interface is complete, the user may activate the "OK" button 948.

As is further described herein, a preferred embodiment enables a user to dynamically create, modify and activate state models during runtime of the central MS, polling gateways, and network element(s). Thus, for example, when a user activates the "Apply" button 950, a most preferred embodiment dynamically updates the state model being executed by the polling gateways to incorporate any changes made by the user (including addition/deletion of states and/or transitions, as well as defined transition actions, within the state model), without requiring that the gateways and/or the network element(s) be shut down and restarted.

Thus, a preferred embodiment enables state models (and/or polling service models) to be updated dynamically. When polling services/state models are updated, the changes need to be stored in a database (or other suitable storage device). However, the polling service/state model could already be in use for network elements. That means the polling service/state model parameters are already in memory for active polling. Therefore, the polling service/state model parameters in memory and that in the database (or other storage device) are not the same. Therefore, most prior art systems require a user to stop and restart the system (i.e., the central NMS) in order to refresh the memory. However, in a preferred embodiment, when the user makes changes, the changes are simultaneously not only updated in the database (the main storage area) but also refreshes the memory as well. Therefore, the user does not have to stop/restart the system in order to update changes in the runtime memory.

Turning to FIG. 9D, an exemplary user interface that may be utilized to enable a user to create and/or modify transitions within a state model is shown, which may be presented to the user in response to a user activating the "Create" button 944 of FIG. 9C, for example. As shown, the user may define a transition by selecting (in input block 960) one of the defined states to transition from and selecting (in input block 961) one of the defined states to transition to. In the example, of FIG. 9D, a transition is being defined for the transition from state Normal to state High. Furthermore, a preferred embodiment enables a user to define a number of consecutive violations (i.e., a number of consecutive times that the transition condition must be true before the state transition is triggered) by specifying in input block 962 such number of consecutive violations required for triggering the state transition. The user may activate the check box 963 to utilize an API to define customized transition conditions. The user may define and/or modify the transition condition (i.e., that defines when the transition is to be triggered) in input block 965. A preferred embodiment includes operators 964, which a user may utilize in creating/modifying the transition condition. In the example of FIG. 9D, the user has created a transition condition of "[equation]>85." Thus, because the number of consecutive occurrences is set to 2, if the result of the state model's equation is greater than 85 on two consecutive polls, the state will transition from Normal to High. Furthermore, buttons 966 and 967 are preferably included to aid a user in creating/modifying a transition condition. More specifically, "Undo" button 966 allows a user to undo the prior entry to the transition condition, and "Clear" button 967 allows a user to clear the transition condition. A user may activate the "Cancel" button 969 to cancel any creations/changes to the state transition, and once the user's interaction with the state transition interface is complete, the user may activate the "OK" button 968, which may, for example, return the user to the state model properties interface of FIG. 9C.

Figure 9E:
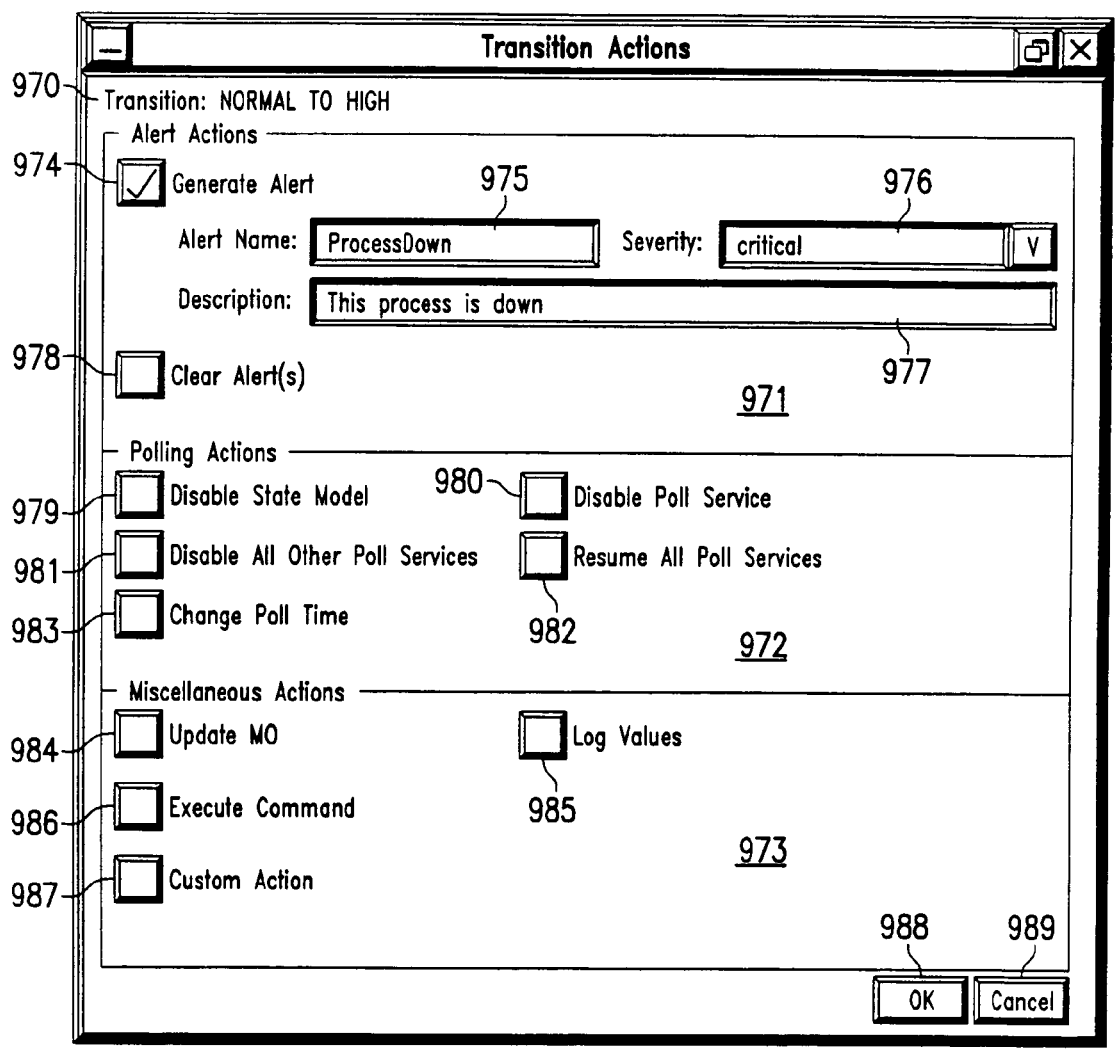

Turning to FIG. 9E, an exemplary user interface that may be utilized to enable a user to create and/or modify transition actions within a state model that are to be executed upon the occurrence of a defined transition is shown, which may be presented to the user in response to a user activating the "Actions" button 947 of FIG. 9C, for example. In the example shown in FIG. 9D, an interface is presented for defining a transition action for the transition "Normal to High" (as shown in transition name 970), which was defined in the example of FIG. 9D. As shown in FIG. 9E, various actions may be selected for execution upon the occurrence of the transition, including as examples alert actions 971, polling actions 972, and miscellaneous actions 973. More specifically, a user may activate check box 974 to generate an alert upon the occurrence of the Normal to High transition. The user can specify an alert name in text box 975 (such as "ProcessDown"), a severity in block 976 (such as critical), and a description of the condition that triggered the alert in block 977 (such as "This process is down"). Thus, for example, upon the transition from Normal to High, an alert having critical severity will be generated and presented to a user (e.g., a system administrator) notifying the user that this process is down. Alternatively, a user may activate check box 978 to cause alert(s) to be cleared upon the occurrence of the Normal to High transition.

As examples of polling actions that a user may activate for execution upon the occurrence of a transition, the user may activate check box 979 to cause a state model(s) to be disabled upon the occurrence of such transition, activate check box 980 to cause a poll service(s) to be disabled upon the occurrence of such transition, activate check box 981 to cause all other poll services to be disabled upon the occurrence of such transition, activate check box 982 to cause all poll services to resume upon the occurrence of such transition, and/or activate check box 983 to cause a change in the polling interval upon the occurrence of such transition. As examples of miscellaneous actions that a user may activate for execution upon the occurrence of a transition, the user may want to update certain objects in the database after receiving new variable values from the network element. For instance, the user can update the objects that represent network elements within new "contact," "location," and "description" information allowing an accurate inventory of the network elements. Additionally, a user may activate check box 985 to cause values (e.g., of variables to report the condition) to be logged within the gateway and/or within the central MS upon the occurrence of such transition, activate check box 986 to cause one or more commands to be executed (as specified by the user) upon the occurrence of such transition, and/or activate check box 987 to cause one or more "custom" action(s) (as defined by the user) to occur upon the occurrence of such transition.

A user may activate the "Cancel" button 989 to cancel any changes made to the transition actions, and once the user's interaction with the transition actions interface is complete, the user may activate the "OK" button 988, which may, for example, return the user to the state model properties interface of FIG. 9C.

Figure 10:
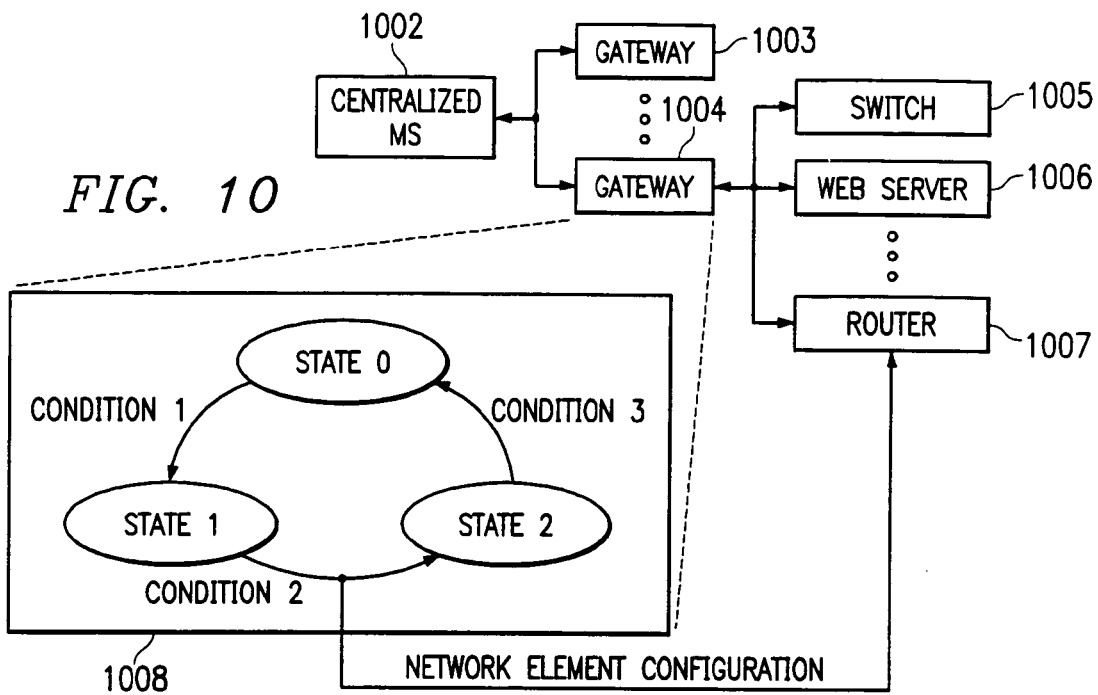
FIG. 10 shows an example of utilizing the state-based modeling system of a preferred embodiment to configure a network element.

A preferred embodiment also enables a user to perform configuration (e.g., to configure some aspect of a network element, such as its interface) and/or service activation/deactivation. For instance, turning to FIG. 10, an example of utilizing the state-based modeling system of a preferred embodiment to configure a network element is shown. As shown, centralized MS 1002 is communicatively coupled to distributed polling gateways 1003 and 1004, which monitor network elements. For instance, gateway 1004 monitors network elements, such as switch 1005, web server 1006, and router 1007. Executing on gateway 1004 is an exemplary state model 1008. State model 1008 includes three states: State 0, State 1, and State 2. As shown, upon a condition (i.e., condition 1) being satisfied, the state transitions from State 0 to State 1. Upon a condition (i.e., condition 2) being satisfied, the state transitions from State 1 to State 2, and upon a condition (i.e., condition 3) being satisfied, the state transitions from State 2 to State 0. As further shown in the example of FIG. 10, upon the transition from State 1 to State 2 (i.e., upon condition 2 being satisfied), gateway 1004 may perform configuration of router 1007. For instance, a user may define in the state model 1008 that upon transitioning from State 1 to State 2, a user-defined transition action specifying one or more configuration actions may be performed. For instance, such configuration actions as adding/deleting user(s), changing password(s), rebooting, and downloading a new operating system and/or other software for execution on the network element, for examples, may be performed on router 1007 by gateway 1004 in response to a transition from State 1 to State 2 of state model 1008.

Figure 11A:
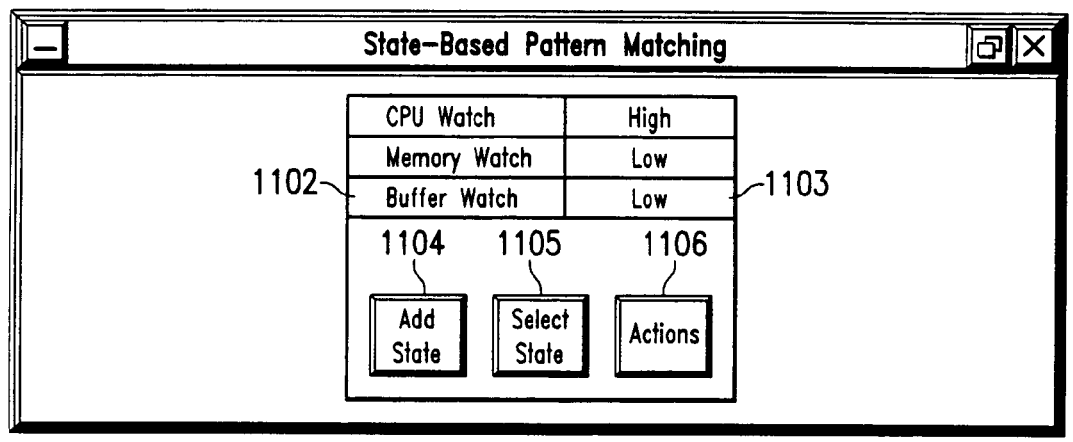
FIG. 11A shows an example of a user interface that may be implemented in a preferred embodiment to enable a user to define a cross-correlation of state models.

In a most preferred embodiment, a user can cross-correlate between different state models. As an example of a user interface that may be implemented to enable a user to define such a cross-correlation of state models is shown in FIG. 11A. As shown in FIG. 11A, a user may, in input block 1102, specify various different state models to cross correlate. For instance, in the example of FIG. 11A, the state models "CPU Watch," "Memory Watch," and "Buffer Watch" defined in the example of FIG. 9A may be specified as being cross correlated. In input block 1103, a user may specify the state of each state model to be correlated. For instance, in the example of FIG. 11A, a user may specify a cross-correlated state model that is triggered upon "CPU Watch" state model being in state "high" while "Memory Watch" and "Buffer Watch" state models are each in state "low." Any number of state models may be specified. For instance, a user may add any number of state models to be cross correlated by activating button 1104, which enables a user to input (e.g., select from a list of available/defined state models) an additional state model in input block 1102. Button 1105 may be provided which enables a user to specify (or select from a list of available/defined states for a state model) a state mode in input block 1103. Button 1106 may be provided to enable a user to assign actions to be triggered upon the state-based correlation (or pattern) being achieved, wherein such actions may include, as examples, sending an email to appropriate personnel, paging appropriate personnel, triggering alerts on the MS, log a report to a file (e.g., in ASCII format), write the achievement of the correlation to a database, and/or perform network element configuration actions.

Figure 11B:
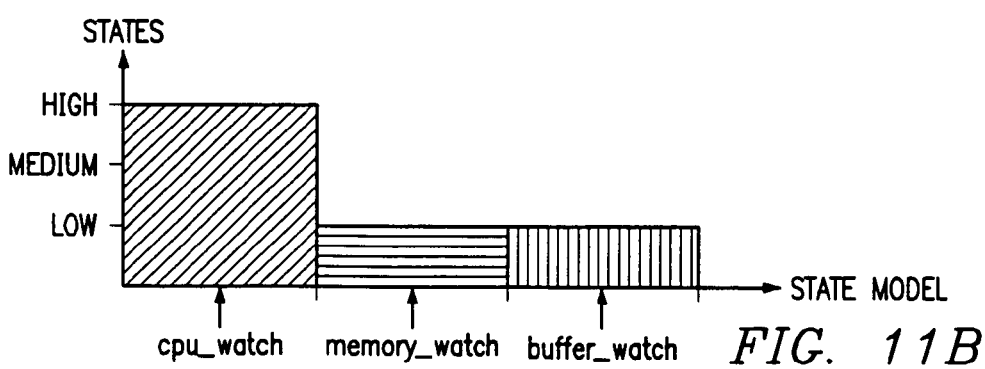
FIG. 11B shows an exemplary state pattern that may be defined by a user for correlating various state models in a preferred embodiment of the present invention.

As an example of a correlation of state models (e.g., an example of a pattern), reference is made to FIG. 11B, which illustrates the pattern defined in FIG. 11A. As shown in the graphic of FIG. 11B, the defined pattern specifies CPU Watch model being in "high" state, Memory Watch model being in "low" state, and Buffer Watch model being in "low" state. The defined cross-correlation model (or pattern model) may be executed upon a polling gateway to monitor one or more network elements for the defined pattern being matched. Upon the defined pattern being matched, one or more defined actions are triggered by the gateway.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for implementing a state model for managing a network coupled to a central management system, said method comprising:

presenting a user interface for said central management system to enable a user to define at least one state model for managing said at least one network element based on a determined state of said at least one network element;

presenting a user interface for said central management system to enable a user to define at least one poll service that includes at least one of said at least one state model; and executing said at least one poll service to manage said at least one network element.

2. The method of claim 1 further comprising the steps of:
distributing said at least one poll service to at least one distributed polling gateway that is communicatively coupled with said at least one network element; and
communicatively coupling said user interface to said at least one distributed polling gateway.

3. The method of claim 1 further comprising:
distributing said at least one poll service defined by said user to at least one distributed polling gateway for execution thereon.

4. The method of claim 3 wherein said at least one distributed polling gateway filters data for said central management system.

5. The method of claim 4 wherein said at least one distributed polling gateway only communicates data satisfying said at least one state model to said central management system.

6. The method of claim 3 wherein said at least one distributed polling gateway executes software to evaluate a user-defined state model condition to determine whether to execute each of said at least one state model.

7. The method of claim 6 wherein said state model condition specifies that said at least one state model is to be executed only for particular network elements.

8. The method of claim 3 wherein said at least one distributed polling gateway operates to retrieve from said at least one network element needed values for values defined for said at least one state model.

9. The method of claim 8 wherein said at least one distributed polling gateway executes software to evaluate one or more user-defined equations for said at least one state model utilizing the retrieved variable values.

10. The method of claim 3 wherein said at least one distributed polling gateway executes software to evaluate one or more user-defined state transition conditions for said at least one state model to determine whether said one or more user-defined state transition conditions are satisfied.

11. The method of claim 10 wherein if said at least one distributed polling gateway determines that said one or more user-defined state transition conditions are not satisfied, then the state of said at least one network element remains unchanged.

12. The method of claim 10 wherein if said at least one distributed polling gateway determines that said one or more user-defined state transition conditions are satisfied, then a state transition for said at least one network element is triggered.

13. The method of claim 12 wherein one or more user-defined transition actions for said state transition are triggered in response to said state transition.

14. The method of claim 10 wherein if said at least one distributed polling gateway determines that said one or more user-defined state transition conditions are satisfied in a user-defined number of consecutive polls of said at least one network element, then a state transition for said at least one network element is triggered.

15. The method of claim 14 wherein one or more user-defined transition actions for said state transition are triggered in response to said state transition.

16. The method of claim 1 further comprising:
distributing said at least one poll service defined by said user to a plurality of distributed polling gateways for execution thereon.

17. The method of claim 16 wherein said plurality of distributed polling gateways each have the ability to communicate with one or more network elements in a particular one of communication protocols selected from the group consisting of: SNMP protocol and CMIP protocol.

18. The method of claim 1 wherein said presenting a user interface on a management system to enable a user to define at least one state model, further comprises:
providing a user interface that allows a user to define a plurality of states within a state model for a network element;
providing a user interface that allows a user to define at least one transition condition that specifies when a transition from one of said plurality of states to another of said plurality of states is to occur; and
providing a user interface that allows a user to define at least one transition action to be performed upon the occurrence of said transition.

19. The method of claim 1 further comprising:
correlating various different models of said at least one state model.

20. The method of claim 19 wherein software code executes on said at least one distributed polling gateway communicatively coupled to said central management system to perform said step of correlating.

21. The method of claim 20 wherein said software code triggers an action based upon a user-defined pattern of states of said various different models being achieved.

22. The method of claim 21 wherein said action includes any one or more selected from the group consisting of:
generating a user alert, clearing said user alert, starting particular services for said at least one network element, stopping said particular services for said at least one network element, changing the interval utilized to poll said at least one network element, enabling a particular poll service for said at least one network element, disabling said particular poll service for said at least one network element, enabling a particular state model for said at least one network element, disabling said particular state model for said at least one network element, triggering one or more user-defined commands to be executed, triggering communication of an email message to personnel, triggering a page of personnel, logging achievement of said pattern of states to a file, and performing network element configuration.

23. The method of claim 1 wherein said at least one network element is selected from the group consisting of:
ATM, Sonet, router, modem, CMIP EMS, switch, OSS, NMS, and web server.

24. The method of claim 1 wherein said user interface is a graphical user interface.

25. The method of claim 1 wherein said at least one state model includes:
software code specifying at least two user-defined states for said at least one network element;
software code specifying at least one transition from a first of said at least two user-defined states to a second of said at least two user-defined states; and
software code specifying at least one transition action to be performed upon the occurrence of said at least one transition.

26. The method of claim 25 wherein said transition action includes any one or more selected from the group consisting of:
generating a user alert, clearing said user alert, starting particular services for said at least one network element, stopping said particular services for said at least one network element, changing the interval utilized to poll said at least one network element, enabling a particular poll service for said at least one network element, disabling said particular poll service for said at least one network element, enabling a particular state model for said at least one network element, disabling said particular state mode 1 for said at least one network element, triggering one or more user-defined commands to be executed, triggering communication of an email message to personnel, triggering a page of personnel, logging achievement of said pattern of states to a file, and performing network element configuration.

27. The method of claim 25 wherein said transition action includes any one or more selected from the group consisting of:
enabling a particular poll service for said at least one network element, disabling said particular poll service for said at least one network element, enabling a particular state model for said at least one network element, disabling said particular state model for said at least one network element, and triggering one or more user-defined commands to be executed.

28. The method of claim 1 wherein said executing said at least one poll service further includes:
triggering execution of said at least one poll service in response to the occurrence of a user-defined event.

29. The method of claim 28 wherein said user-defined event includes a particular fault condition defined by a user.

30. The method of claim 1 wherein said at least one poll service is executed only if a user-defined activation condition for said at least one poll service is satisfied.

31. The method of claim 30 wherein said user-defined activation condition specifies that said poll service is for a particular type of network element.

32. The method of claim 1 wherein said central management system enables a user to dynamically define said at least one poll service during runtime.

33. The method of claim 1 wherein said central management system enables a user to dynamically define said at least one state model during runtime.

34. The method of claim 1 wherein said central management system enables a user to dynamically modify an existing poll service or state model during runtime.

35. A method for enabling state-based management of a network, wherein network elements are managed based on their state, said method comprising:
receiving input from a user at a management system to define at least one state model for managing at least one network element based on a determined state of said at least one network element;
receiving input from a user at said management system to define at least one poll service that includes at least one of said at least one state model;
distributing said at least one poll service including said at least one state model to at least one distributed polling gateway that is communicatively coupled with said at least one network element; and
executing said at least one poll service at said at least one distributed polling gateway to manage said at least one network element,
wherein said management system is a central management system that is communicatively coupled to said at least one distributed polling gateway.

36. The method of claim 35 further comprising:
distributing said at least one poll service defined by said user to said at least one distributed polling gateway for execution thereon.

37. The method of claim 36 wherein said at least one distributed polling gateway filters data for said central management system.

38. The method of claim 37 wherein said at least one distributed polling gateway only communicates data satisfying said at least one state model to said central management system.

39. The method of claim 36 wherein said at least one distributed polling gateway executes software to evaluate one or more user-defined state transition conditions for said at least one state model to determine whether said one or more user-defined state transition conditions are satisfied.

40. The method of claim 39 wherein if said at least one distributed polling gateway determines that said one or more user-defined state transition conditions are satisfied, then a state transition for said at least one network element is triggered.

41. The method of claim 40 wherein one or more user-defined transition actions for said state transition are triggered in response to said state transition.

42. The method of claim 35 wherein said received input from said user to define said at least one state model comprises:
input to define a plurality of states within a state model for a network element;
input to define at least one transition condition that specifies when a transition from one state to another state is to occur; and
input to define at least one transition action to be performed upon the occurrence of said at least one transition.

43. The method of claim 35 further comprising:
correlating various models from said at least one state model.

44. The method of claim 43 wherein software code executes on said at least one distributed polling gateway communicatively coupled to said central management system to perform said step of correlating.

45. The method of claim 44 wherein said software code triggers an action based upon a user-defined pattern of states of said various models being achieved.

46. The method of claim 45 wherein said action includes any one or more selected from the group consisting of:
generating a user alert, clearing said user alert, starting particular services for said at least one network element, stopping said particular services for said at least one network element, changing the interval utilized to poll said at least one network element, enabling a particular poll service for said at least one network element, disabling said particular poll service for said at least one network element, enabling a particular state model for said at least one network element, disabling said particular state model for said at least one network element, triggering one or more user-defined commands to be executed, triggering communication of an email message to personnel, triggering a page of personnel, logging achievement of said pattern of states to a file, and performing network element configuration.

47. A system for managing network elements based on their state, said system comprising:
at least one network element;
one or more distributed gateways for monitoring said at least one network element, said one or more distributed gateways communicatively coupled to a central management system between said at least one network element and said central management system; and
at least one state model executing on said one or more distributed gateways for managing said at least one network element based on a determined state of said at least one network element, said at least one state model capable of being dynamically defined during runtime.

48. The system of claim 47 further comprising:
software executing on said central management system to enable a user to define said at least one state model, wherein once a user defines said at least one state model, it is communicated to said one or more distributed gateways for execution thereon.

49. The system of claim 47 wherein said one or more distributed gateways further include at least one user-defined poll service that includes one or more of said at least one state model.

50. The system of claim 49 further comprising:
software executing on said central management system to enable a user to define said at least one poll service, wherein once a user defines said at least one poll service, it is communicated to said one or more distributed gateways for execution thereon.

51. The system of claim 47 wherein said one or more distributed polling gateways only communicate data satisfying said at least one state model to said central management system.

52. The system of claim 47 wherein said one or more distributed polling gateways execute software to evaluate one or more user-defined state transition conditions for said at least one state model to determine whether said one or more user-defined state transition conditions are satisfied.

53. The system of claim 52 wherein if said one or more distributed polling gateways determine that said one or more user-defined state transition conditions are satisfied, then a state transition for said at least one network element is triggered.

54. The system of claim 53 wherein one or more user-defined transition actions for said state transition are triggered in response to said state transition.

55. The system of claim 47 wherein said one or more distributed polling gateways further comprises:
at least one pattern-based state model executing thereon to correlate various of said at least one state model.

56. The system of claim 55 wherein said at least one pattern-based state model specifies a user-defined pattern of states of said various models, and wherein said at least one pattern-based state model triggers an action upon said user-defined pattern of states being achieved.

57. The system of claim 56 wherein said action includes anyone or more selected from the group consisting of:
generating a user alert, clearing said user alert, starting particular services for said at least one network element, stopping said particular services for said at least one network element, changing the interval utilized to poll said at least one network element, enabling a particular poll service for said at least one network element, disabling said particular poll service for said at least one network element, enabling a particular state model for said at least one network element, disabling said particular state model for said at least one network element, triggering one or more user-defined commands to be executed, triggering communication of an email message to personnel, triggering a page of personnel, logging achievement of said pattern of states to a file, and performing network element configuration.

58. Method for performing state-based management of a network, wherein network elements are manageable based on their state through a central management system, said method comprising:
executing, on at least one distributed gateway located between the central management system and the network elements, at least one user-defined state model for managing at least one network element based on a determined state of said at least one network element, wherein said executing at least one user-defined state model includes polling said at least one network element for data, evaluating said data to determine whether a user-defined state transition condition is satisfied, and triggering a state transition if said user-defined state transition condition is satisfied for a user-defined number of consecutive polls of said at least one network element.

59. The method of claim 58 wherein said user-defined number of consecutive polls is a plurality of polls.

60. The method of claim 58 further comprising:
software executing on said central management system to enable a user to define said at least one state model wherein once a user defines said at least one state model, it is communicated to one or more distributed gateways that are communicatively coupled to said central management system for execution on said one or more distributed gateways.

61. The method of claim 58 wherein if said user-defined state transition condition is satisfied for a user-defined number of consecutive polls of said at least one network element, then one or more user-defined transition actions for the user defined state transition are triggered.

62. The method of claim 61 wherein said one or more transition actions include any one or more selected from the group consisting of:
generating a user alert, clearing said user alert, starting particular services for said at least one network element, stopping said particular services for said at least one network element, changing the interval utilized to poll said at least one network element, enabling a particular poll service for said at least one network element, disabling said particular poll service for said at least one network element, enabling a particular state model for said at least one network element, disabling said particular state model for said at least one network element, triggering one or more user-defined commands to be executed, triggering communication of an email message to personnel, triggering a page of personnel, logging achievement of said pattern of states to a file, and performing network element configuration.

63. A system for managing at least one network element comprising:
at least one network element;
at least one gateway for monitoring said at least one network element, said at least one gateway communicatively coupled to a central management system between said at least one network element and said central management system; and
at least one state model executing on said at least one gateway for managing said at least one network element based on a determined state of said at least one network element, said at least one state model capable of being dynamically defined during runtime.

* * * * *